United States Patent
Tooyama et al.

(10) Patent No.: US 7,321,682 B2
(45) Date of Patent: *Jan. 22, 2008

(54) IMAGE GENERATION SYSTEM, IMAGE GENERATION METHOD, PROGRAM, AND INFORMATION STORAGE MEDIUM

(75) Inventors: Shigeki Tooyama, Kanagawa (JP); Atsushi Miyazawa, Tokyo (JP)

(73) Assignee: Namco Bandai Games, Inc., Tokyo (JP)

( * ) Notice: Subject to any disclaimer, the term of this patent is extended or adjusted under 35 U.S.C. 154(b) by 719 days.

This patent is subject to a terminal disclaimer.

(21) Appl. No.: 10/704,970

(22) Filed: Nov. 12, 2003

(65) Prior Publication Data

US 2004/0208358 A1 Oct. 21, 2004

(30) Foreign Application Priority Data

Nov. 12, 2002 (JP) .............................. 2002-328861

(51) Int. Cl.
*G06K 9/00* (2006.01)
(52) U.S. Cl. .................................. 382/154
(58) Field of Classification Search ............... 382/154; 345/419, 420
See application file for complete search history.

(56) References Cited

U.S. PATENT DOCUMENTS

| | | | | |
|---|---|---|---|---|
| 5,198,895 A | * | 3/1993 | Vick | .......................... 348/115 |
| 5,905,499 A | * | 5/1999 | McDowall et al. | ......... 345/419 |
| 5,991,087 A | * | 11/1999 | Rallison | ...................... 359/631 |
| 6,333,747 B1 | * | 12/2001 | Murata et al. | .............. 345/582 |
| 6,429,867 B1 | * | 8/2002 | Deering | ....................... 345/423 |
| 6,614,427 B1 | * | 9/2003 | Aubrey | ........................ 345/419 |
| RE39,342 E | * | 10/2006 | Starks et al. | ................. 345/419 |
| 2003/0026474 A1 | * | 2/2003 | Yano | ........................... 382/154 |
| 2004/0223219 A1 | | 11/2004 | Tooyama et al. | |
| 2005/0036673 A1 | | 2/2005 | Ohba et al. | |

FOREIGN PATENT DOCUMENTS

JP A 2000-56411 2/2000

* cited by examiner

*Primary Examiner*—Vikkram Bali
(74) *Attorney, Agent, or Firm*—Oliff & Berridge, PLC

(57) ABSTRACT

An image generation system includes a first image generation section for generating images IL1 and IR1 for the left eye and the right eye, a second image generation section for generating images IL2 and IR2 for the left eye and the right eye by performing correction processing to remove perspective of images in the IL1 and IR1 at a base surface, and a stereoscopic image generation section for generating a stereoscopic image based on the IL2 and IR2. It further includes an image generation section for generating an image IL for the left eye by rendering a projection of each point of a graphic object onto a base surface BS in a projection direction linking a viewpoint position for the left eye VPL to each point of the graphic object OB, and for generating an image IR for the right eye by rendering a projection of each point of the graphic object onto the base surface BS in a projection direction linking a viewpoint position for the right eye VPL to each point of the graphic object OB, and the stereoscopic image generation section for generating a stereoscopic image based on the IL and IR.

10 Claims, 29 Drawing Sheets

FIG. 27A PARALLEL MOVEMENT Ty (y = −vcos α)
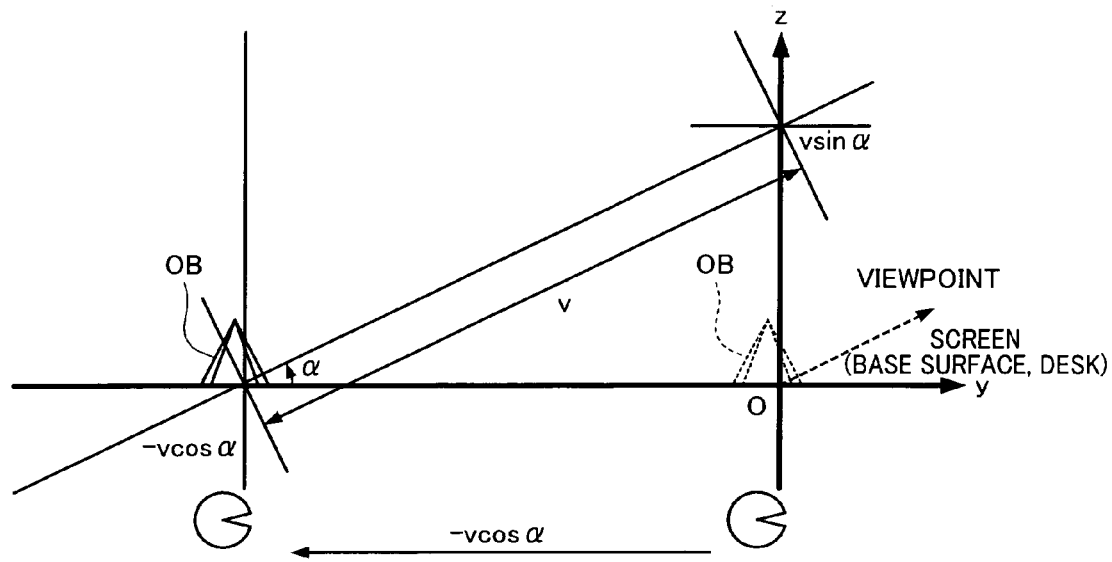
FIG. 27B PROJECTION Pz
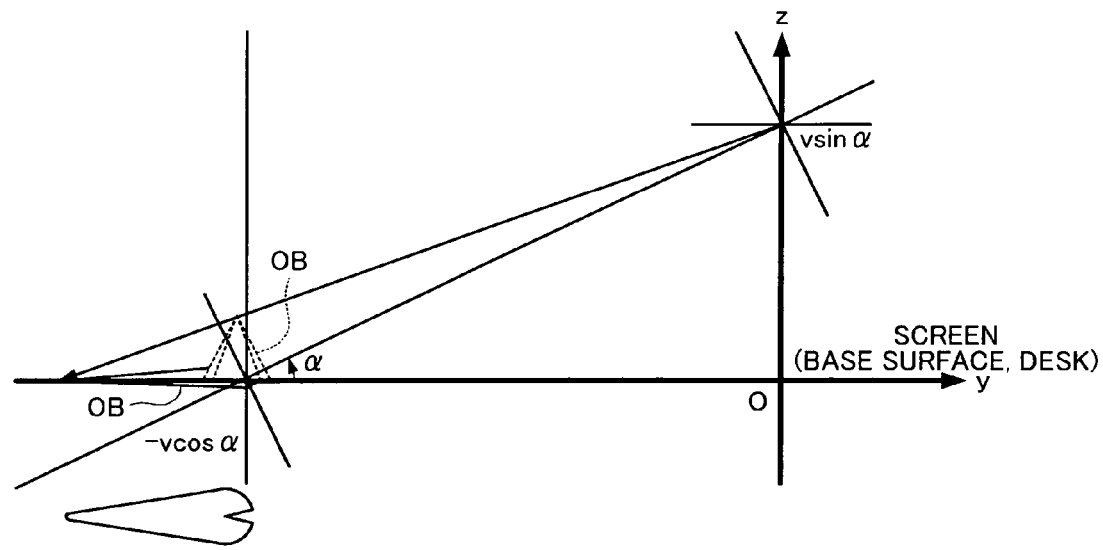

PARALLEL MOVEMENT Ty (y = vcos $\alpha$)

IMAGE GENERATION SYSTEM, IMAGE GENERATION METHOD, PROGRAM, AND INFORMATION STORAGE MEDIUM

Japanese Patent Application No. 2002-328861, filed on Nov. 12, 2002, is hereby incorporated by reference in its entirety.

BACKGROUND OF THE INVENTION

The present invention relates to an image generation system, an image generation method, a program, and an information storage medium.

A technique is known in the art of preparing an image for the left eye, taken by a camera that is equivalent to the left eye, and an image for the right eye, taken by a camera that is equivalent to the right eye, then combining these images by anaglyph processing or the like to obtain a stereoscopic image (printed material for stereoscopic viewing), as disclosed in Japanese Patent Application Laid-Open No. 2000-56411, by way of example.

There are three physiological functions that enable a human being to experience the feeling of three dimensions: (1) binocular parallax (difference in the line-of-sight angles thereof) that creates an offset in the imaging of the retinas due to the spatial separation of the left and right eyes, (2) convergence, which is a function that directs the eyes inward, and (3) focal adjustment (focal distance) of adjusting the thickness of the lens in answer to distance to the object. The human being processes the three physiological functions of binocular parallax, convergence, and focal adjustment within the brain, to produce the stereoscopic feeling.

The relationships between these three physiological functions are usually linked within the brain. If an error or inconsistency should arise in these relationships, therefore, the brain will try to force these stereoscopic linkages, which creates a situation in which the image feels unnatural or the viewer cannot recognize it as a stereoscopic image.

Incidentally, stereoscopic viewing in the prior art used only binocular parallax and convergence for representing a stereoscopic view. For that reason, the focus (focal distance) to any point within the surface of the stereoscopic image (printed material for stereoscopic viewing) remains substantially constant, so that offsets in binocular parallax or convergence occur at substantially all the locations in the stereoscopic image, making it impossible to implement a stereoscopic view that does not force the brain of a human being.

BRIEF SUMMARY OF THE INVENTION

According to one aspect of the present invention, there is provided an image generation system which generates a stereoscopic image, the image generation system comprising:

a first image generation section which generates a first image for the left eye as seen from a viewpoint position for the left eye within an object space, and also generates a first image for the right eye as seen from a viewpoint position for the right eye within the object space;

a second image generation section which generates a second image for the left eye by subjecting the first image for the left eye to correction processing for removing perspective of an image at a base surface in the first image for the left eye, and also generates a second image for the right eye by subjecting the first image for the right eye to correction processing for removing perspective of an image at the base surface in the first image for the right eye; and a stereoscopic image generation section which generates a stereoscopic image based on the second image for the left eye and the second image for the right eye.

According to another aspect of the present invention, there is provided an image generation system which generates a stereoscopic image, the image generation system comprising:

a first image generation section which generates a first image for the left eye as seen from a viewpoint position for the left eye within an object space, and also generates a first image for the right eye as seen from a viewpoint position for the right eye within the object space;

a second image generation section which generates a second image for the left eye based on the first image for the left eye, and generates a second image for the right eye based on the first image for the right eye; and a stereoscopic image generation section which generates a stereoscopic image based on the second image for the left eye and the second image for the right eye, wherein the second image generation section:

generates the second image for the left eye by mapping a texture of the first image for the left eye onto a rectangular polygon; and generates the second image for the right eye by mapping a texture of the first image for the right eye onto a rectangular polygon.

According to a further aspect of the present invention, there is provided an image generation system which generates a stereoscopic image, the image generation system comprising:

an image generation section which generates an image for the left eye by rendering a projection of each point of a graphic object onto a base surface which is not orthogonal to a line-of-sight direction, in a projection direction linking a viewpoint position for the left eye to each point of the graphic object within an object space, and also generates an image for the right eye by rendering a projection of each point of the graphic object onto the base surface, in a projection direction linking a viewpoint position for the right eye to each point of the graphic object within the object space; and a stereoscopic image generation section which generates a stereoscopic image based on the image for the left eye and the image for the right eye.

BRIEF DESCRIPTION OF THE SEVERAL VIEWS OF THE DRAWING

FIGS. 27A and 27B are illustrative of conversions that form the second stereoscopic viewing method;

DETAILED DESCRIPTION OF THE EMBODIMENT

The embodiments of the present invention are described below with reference to the drawings.

Note that the embodiments described below do not limit the scope of the invention defined by the claims laid out herein. Similarly, the overall configuration of the embodiments below should not be taken as limiting the subject matter defined by the claims herein.

This embodiment implements a stereoscopic view by either of two methods, as described below.

1. First Stereoscopic Viewing Method

Figure 1:
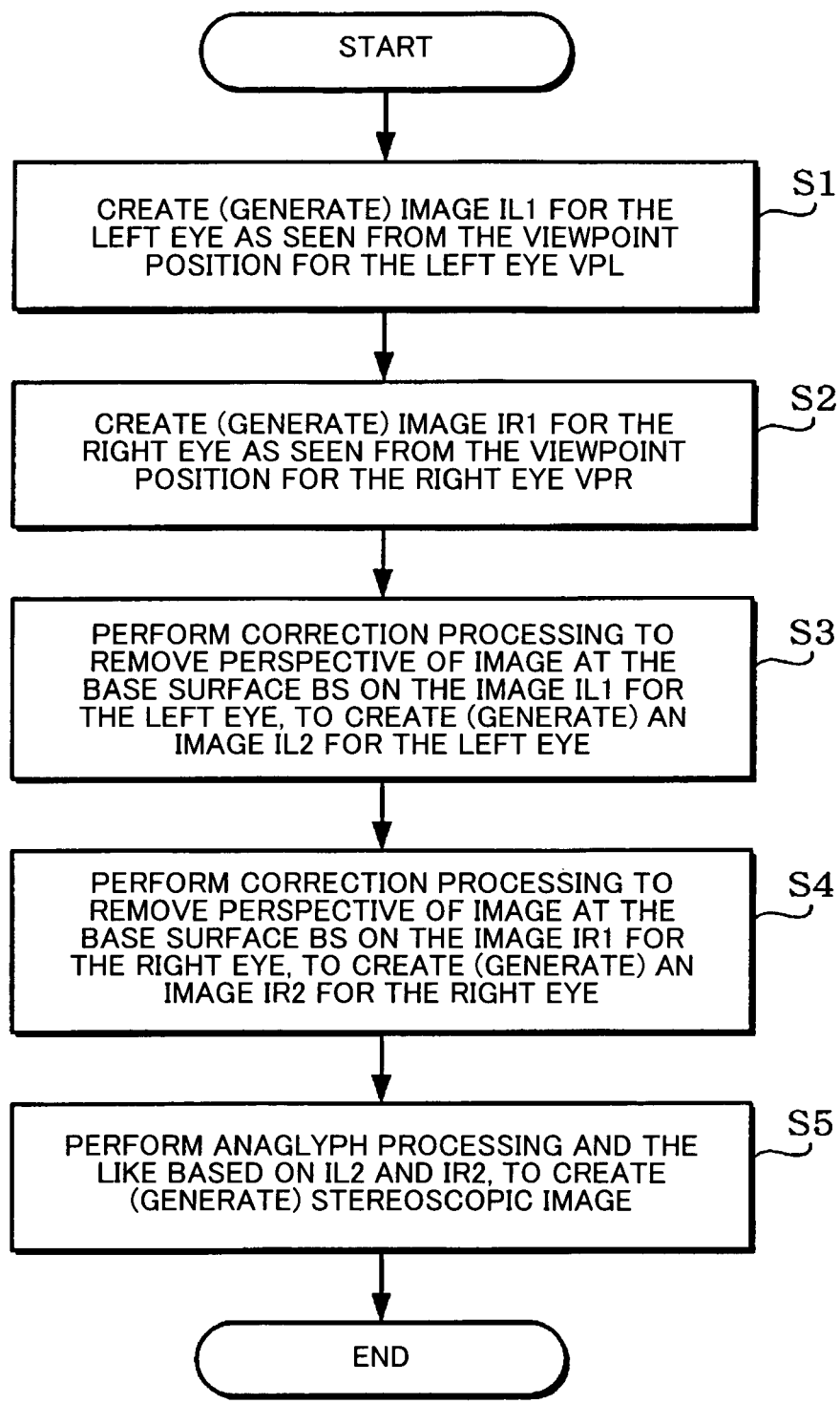
FIG. 1 is a flowchart of a first stereoscopic viewing method in accordance with an embodiment of the present invention.

A flowchart of a first stereoscopic viewing method in accordance with this embodiment is shown in FIG. 1.

First of all, the system creates (generates) a first image IL1 for the left eye and a first image IR1 for the right eye, for stereoscopic viewing (steps S1 and S2). More specifically, the image IL1 for the left eye as seen from a viewpoint position VPL for the left eye and the image IR1 for the right eye as seen from a viewpoint position for the right eye VPR are created (generated).

Figure 2:
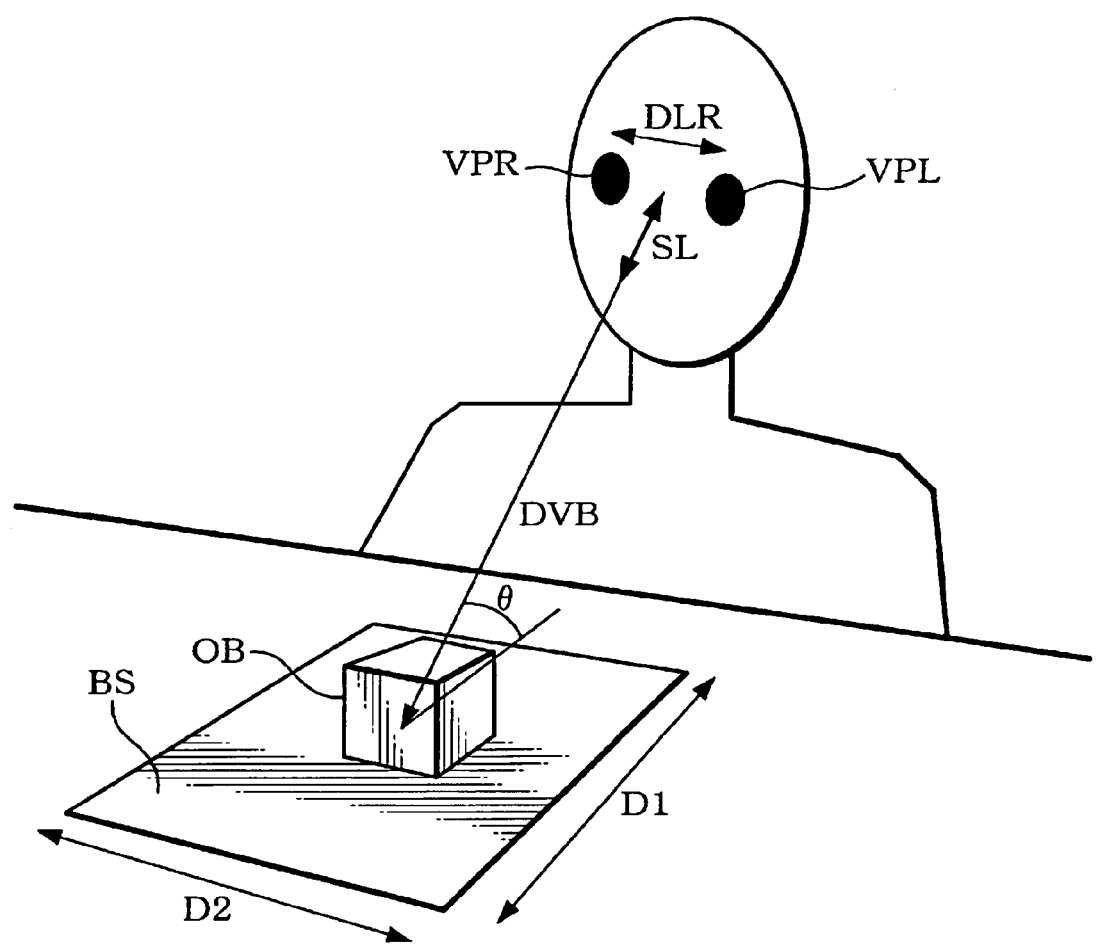
FIG. 2 is illustrative of the first stereoscopic viewing method in accordance with an embodiment of the present invention.

In this case, the viewpoint positions for the left eye and the right eye VPL and VPR are positions at which the left eye and the right eye of a viewer are assumed to be, as shown in FIG. 2. If, for example, images IL1 and IR1 for the left eye and the right eye are created by photographing with a camera (digital camera), the camera is positioned at these VPL and VPR positions to capture the images IL1 and IR1 for the left eye and the right eye. In such a case, two cameras disposed at VPL and VPR could capture pictures simultaneously, or the position of one camera could be changed for the captures.

Alternatively, if the images IL1 and IR1 for the left eye and the right eye are generated by a system that generates computer graphics (CG) images and game images (real-time moving images), virtual cameras are disposed at these VPL and VPR positions to generate the images IL1 and IR1 for the left eye and the right eye. In other words, images are obtained as seen from VPL and VPR in the object space.

Figure 3:
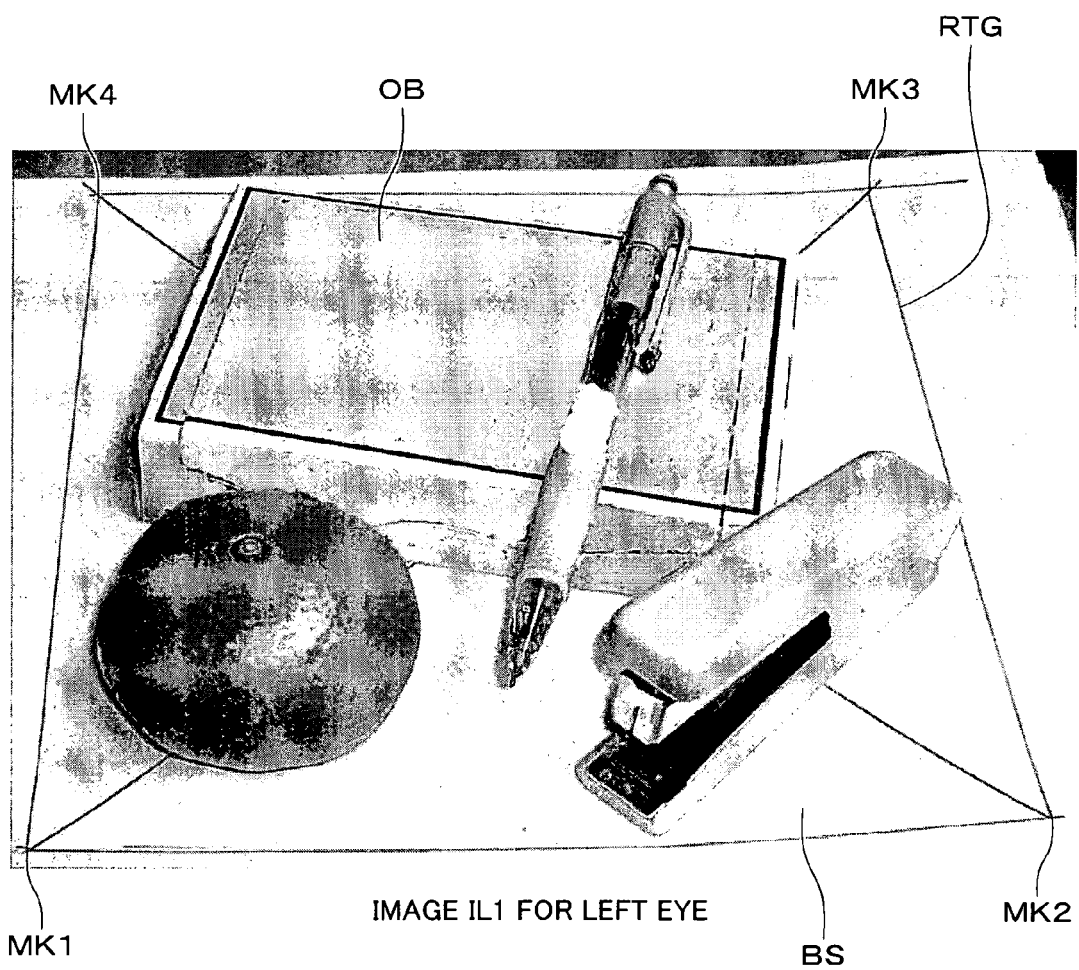
FIG. 3 shows an example of an image IL1 for the left eye.
Figure 4:
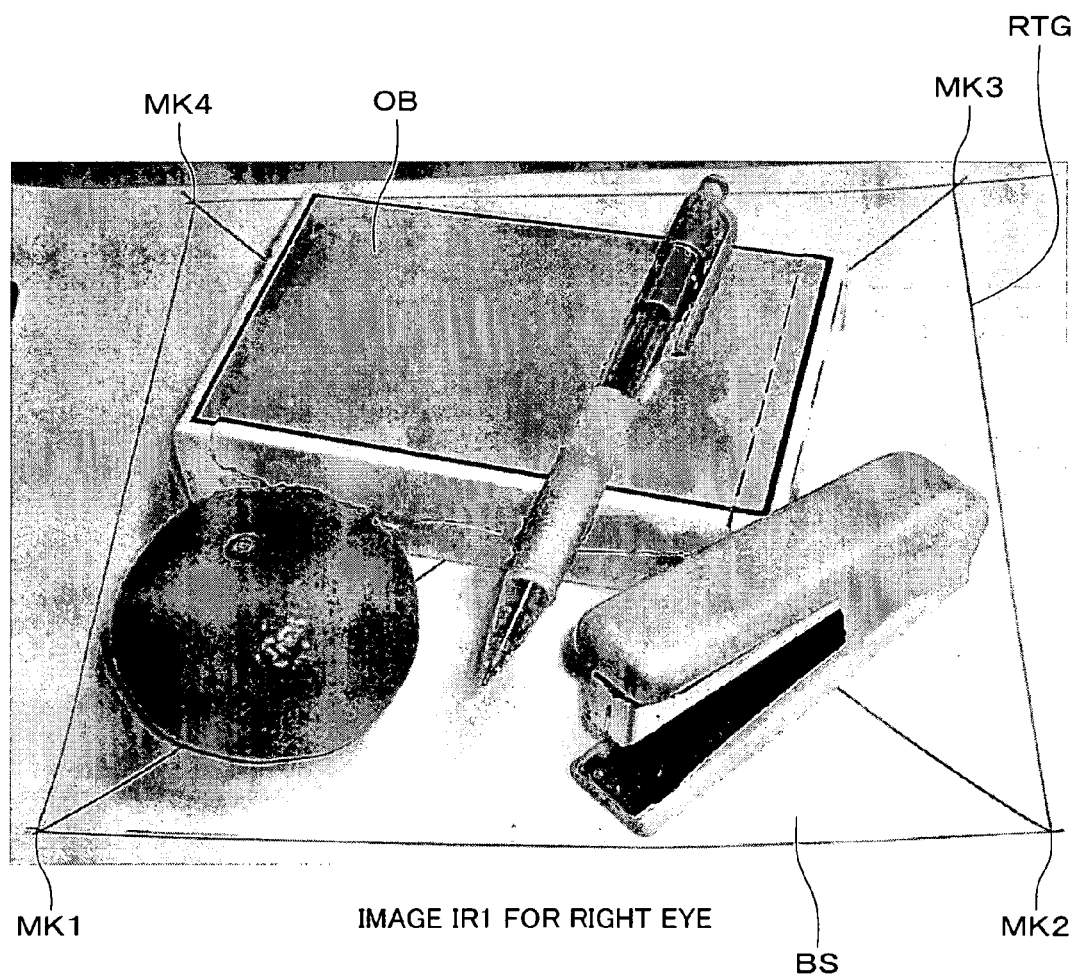
FIG. 4 shows an example of an image IR1 for the right eye.

Examples of the image IL1 for the left eye and the image IR1 for the right eye as shown in FIGS. 3 and 4. These are examples in which the images IL1 and IR1 have been created by photography with a camera (digital camera). Various objects (synonymously or in a narrow sense: substances, subjects, items, hereinafter the same) such as a tangerine, a box, a ballpoint pen, and a stapler are disposed on a base surface (a mounting surface on which the objects are placed). The image IL1 for the left eye is obtained by disposing a camera at the viewpoint position VPL for the left eye and capturing the image by directing the line of sight (direction) of the camera toward the object (the point of regard, or a representative point of the object). Similarly, the image IR1 for the right eye is obtained by disposing the camera at the viewpoint position for the right eye VPR and directing the line of sight of the camera toward the object. As shown in FIGS. 3 and 4, there is an offset between the line-of-sight angles (viewing directions) of these images IL1 and IR1 for the left eye and the right eye, and a stereoscopic view is implemented by using the binocular parallax caused by that offset in the line-of-sight angles.

Note that in this embodiment a display surface of the display section on which a stereoscopic image is displayed can be set to be a base surface.

With CGs or a game, graphic objects (such as graphic objects that model a tangerine, a box, a ballpoint pen, and a stapler) are disposed on a base surface that has been set within an object space, and virtual cameras are positioned at VPL and VPR. Images similar to those of FIGS. 3 and 4 can be generated by directing the line-of-sight (direction) of each virtual camera towards the graphic objects (point of regard, or representative point of the graphic objects) then generating images as seen from the virtual cameras.

As shown in step S3 of FIG. 1, correction processing for removing the perspective of the images at a base surface BS is done on the first image IL1 for the left eye obtained by step S1, to create (generate) a second image IL2 for the left eye. Similarly, as shown at step S4, correction processing for removing the perspective of the images at the base surface BS is done on the first image IR1 for the right eye obtained by step S2, to create (generate) a second image IR2 for the right eye.

Figure 5:
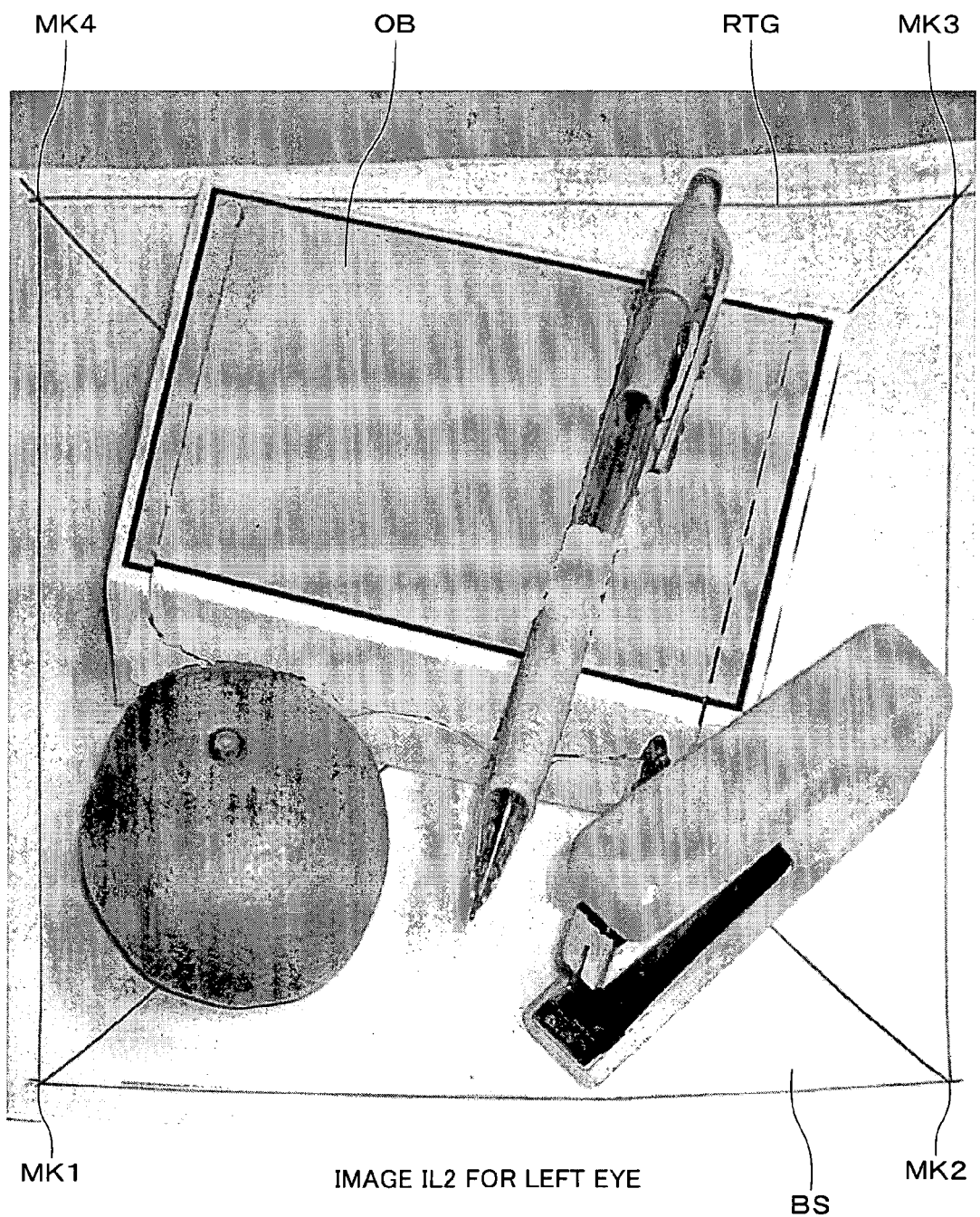
FIG. 5 shows an example of an image IL2 for the left eye.
Figure 6:
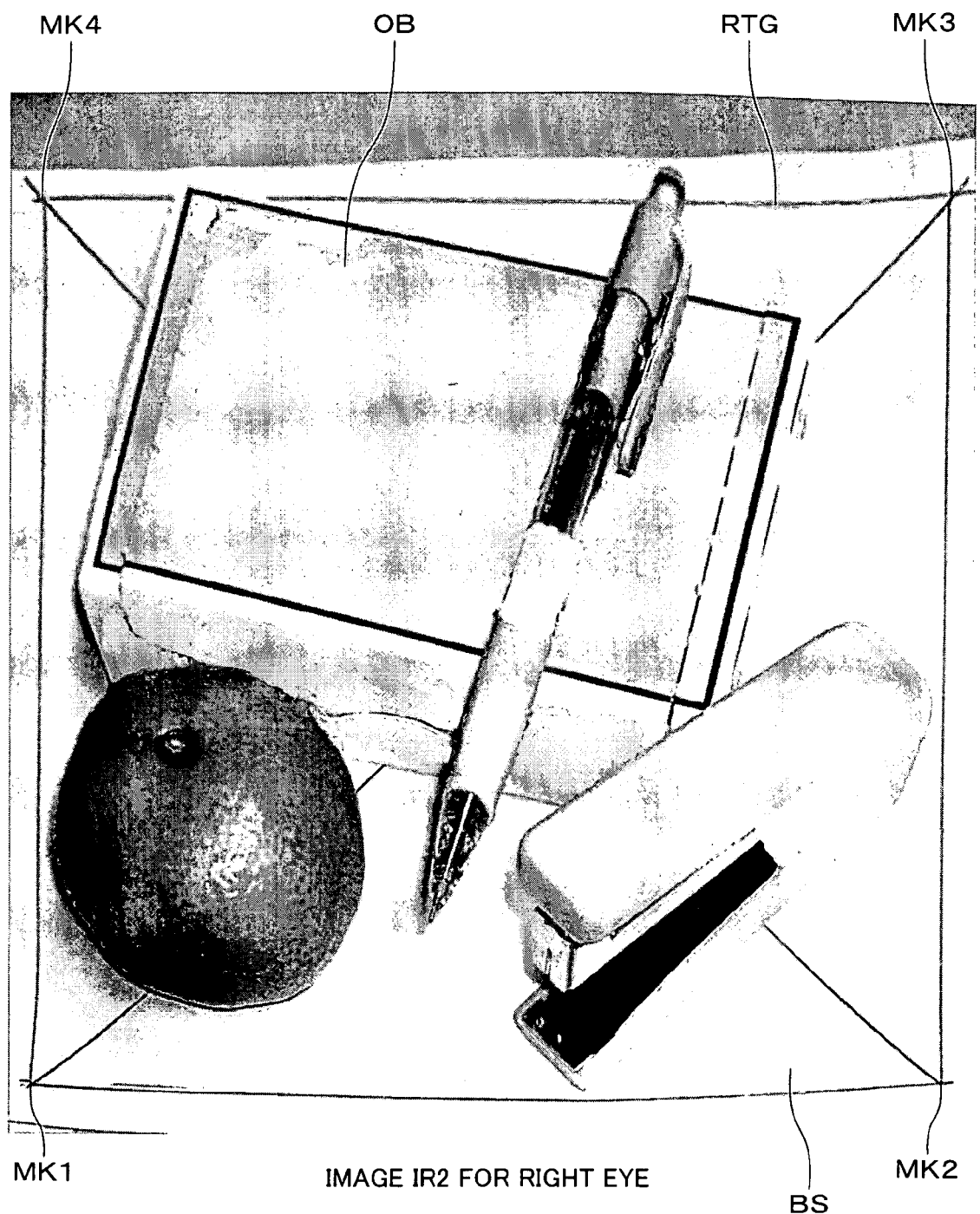
FIG. 6 shows an example of an image IR2 for the right eye.

Examples of the image IL2 for the left eye and the image IR2 for the right eye obtained by the correction processing are shown in FIGS. 5 and 6. As shown by way of example in FIGS. 3 and 4, a rectangle RTG (where "rectangle" has a general meaning that also comprises "square", which is the same hereinafter) that is drawn on the base surface BS is also in perspective. In contrast thereto, the perspective of the rectangle RTG has been removed in FIGS. 5 and 6.

Figure 8A:
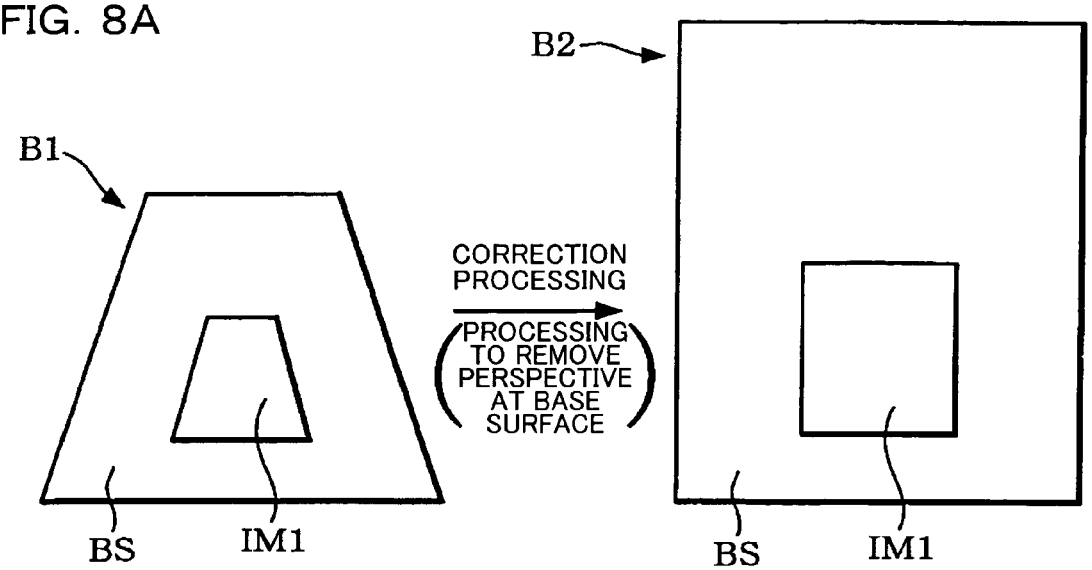
FIGS. 8A, 8B, and 8C are illustrative of correction processing to remove perspective.

In this case, the correction processing for removing perspective of this embodiment is processing for removing perspective (depth perception) from an image of the base surface BS itself, an image IM1 drawn on the base surface, and an image of portions of an object OB (graphic object) that are in contact with the base surface BS, as shown in FIG. 8A. In other words, whereas the distance between vertices becomes smaller further away from the viewpoint in B1 of FIG. 8A, the distance between the vertices does not change further away from the viewpoint in B2 of FIG. 8A. The execution of such correction processing makes it possible to create (generate) an image as if seen from above, for the image of the base surface BS. Note that this correction processing need not necessarily remove the perspective completely; it could equally well remove enough of the perspective to avoid incongruity in the stereoscopic view.

As shown at step S5 of FIG. 1, a stereoscopic image (image data) is created (generated), based on the second image IL2 for the left eye and the second image IR2 for the right eye. More specifically, anaglyph processing or the like based on IL2 and IR2 is done to create (generate) a stereoscopic image.

A color printer (generally speaking: a printing machine) using a method such as an inkjet method or a laser printer method is then used to print this stereoscopic image (photographic image or CG image) onto a print medium, to fabricate printed material for stereoscopic viewing. Note that the printed material for stereoscopic viewing could also be fabricated by making a master print by the color printer (print machine) then copying this printed material for stereoscopic viewing. This has the advantage of making it possible to fabricate large volumes of the printed material for stereoscopic viewing within a short period of time.

Displaying the stereoscopic image on the display section of an image generation system makes it possible to generate game images (moving images) in real time. Note that in this case, stereoscopic images that have been obtained by anaglyph processing could be displayed directly on the display section and viewed by using spectacles (generally speaking: an appliance) that have been provided with color filters (red and blue). Alternatively, the images IL2 and IR2 for the left eye and the right eye could be displayed alternately on the display section with different frames and viewed by using spectacles that have been provided with liquid-crystal shutters or the like.

Figure 7:
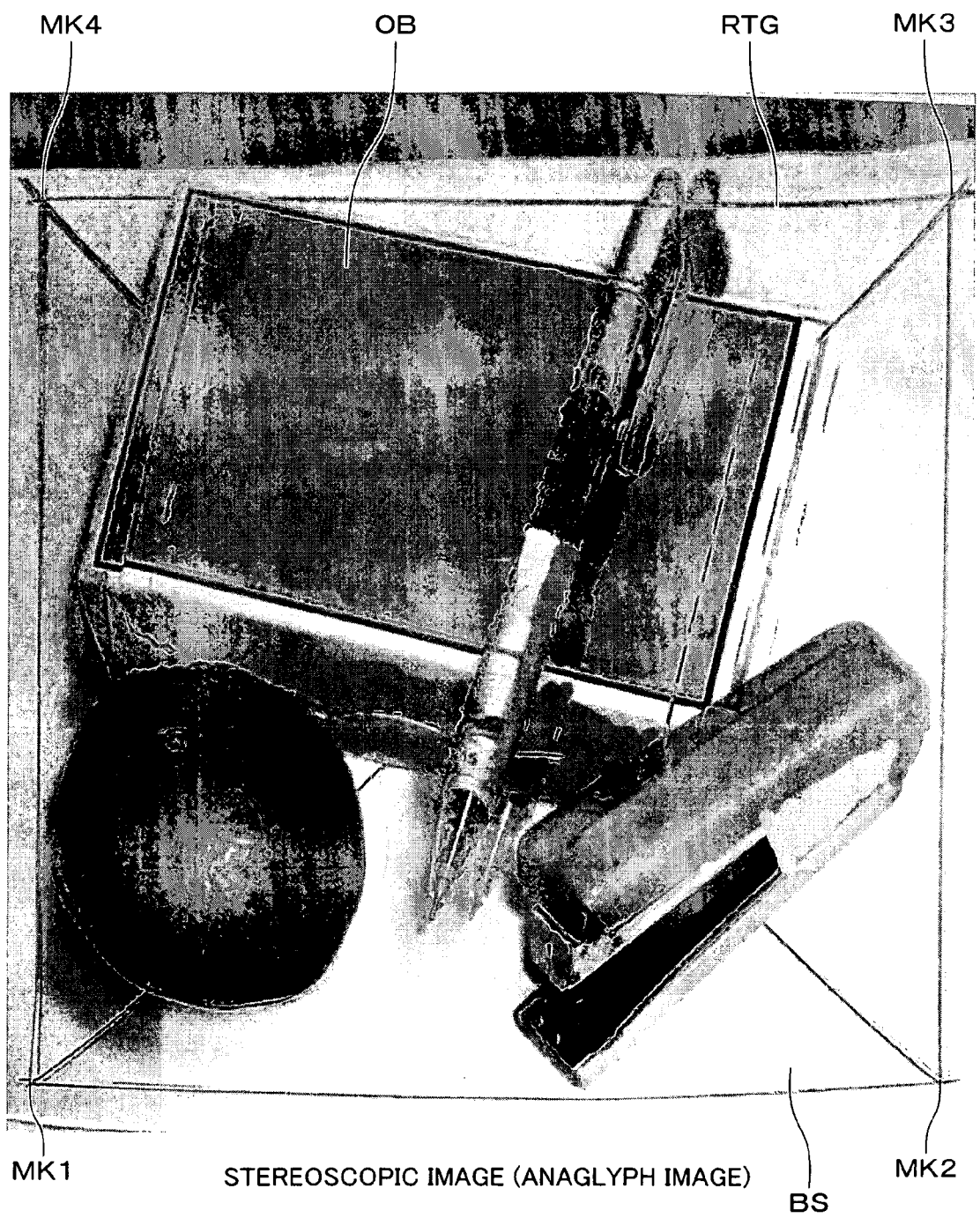
FIG. 7 shows an example of a stereoscopic image (an anaglyph image)

An example of a stereoscopic image obtained by anaglyph processing based on the images IL2 and IR2 for the left eye and the right eye of FIGS. 5 and 6 is shown in FIG. 7.

This stereoscopic image shown in FIG. 7 is a composite of the image IL2 for the left eye (IL) and the image IR2 for the right eye (IR). The image IL2 for the left eye and the image IR2 for the right eye each comprise an image of the object OB disposed on the base surface BS. An image of the base surface BS is also comprised therein.

Figure 9:
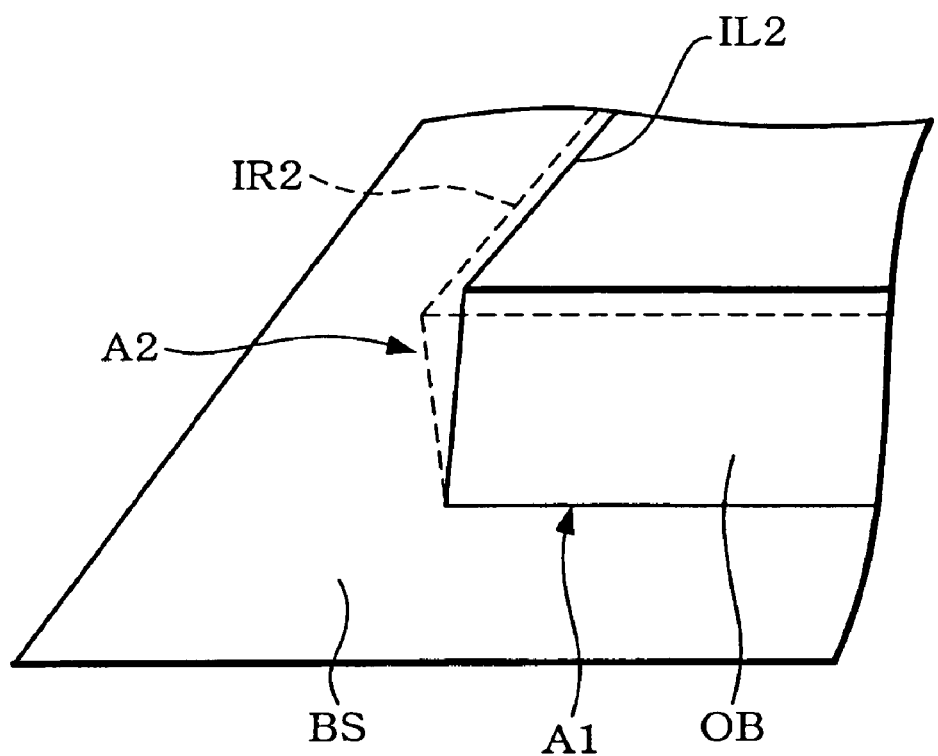
FIG. 9 is illustrative of characteristics of a stereoscopic image that is obtained by an embodiment of the present invention.

As shown at A1 in FIG. 9, the object image of the image IL2 for the left eye and the object image of the image IR2 for the right eye match at the position of the base surface BS (note that it is not always necessary that they should match completely). In other words, the print position (display position) of the object image of the image IL2 for the left eye and the print position (display position) of the object image of the image IR2 for the right eye match at the base surface BS.

With increasing distance from the base surface BS, however, the offset between the object image of the image IL2 for the left eye and the object image for the image IR2 for the right eye grows larger, as shown at A2 in FIG. 9. More specifically, portions of the object OB that are positioned higher than the base surface BS have a larger offset between the print position (display position) for the image IL2 for the left eye and the print position (display position) for the image IR2 for the right eye.

Printed material for stereoscopic viewing can be fabricated by printing the stereoscopic images shown in FIGS. 7 and 9 on a print medium. A stereoscopic view can be implemented by viewing this printed material for stereoscopic viewing through spectacles provided with a red-color filter for the left eye and a blue-color filter for the right eye, by way of example. In addition, a game stereoscopic image can be generated by displaying the stereoscopic image of FIGS. 7 and 9 on a display section.

Figure 8B:
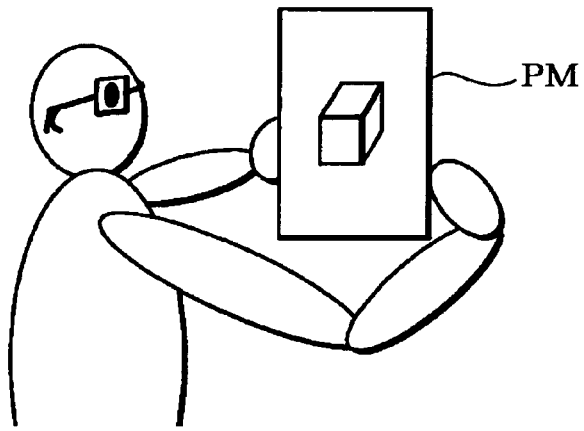

Conventionally, the printed material for stereoscopic viewing PM (or display screen of a display section, hereinafter the same) has been assumed to be disposed with the surface thereof parallel to a vertical surface, with the viewer looking at the printed material for stereoscopic viewing PM face-on, as shown in FIG. 8B. For that reason, images IL1 and IR1 for the left eye and the right eye such as those of FIGS. 3 and 4 are subjected to anaglyph processing without modification, to create the printed material for stereoscopic viewing PM. Since some perspective does remain in the images of FIGS. 3 and 4, the printed material for stereoscopic viewing PM shown in FIG. 8B will appear to be a correct image if viewed face-on, but only from the perspective perception point of view.

However, when the viewer looks at the printed material for stereoscopic viewing PM face-on, as shown in FIG. 8B, the focus (focal distance) to any point of the entire surface of the PM ends up the same. An inconsistency or error in the relationship between focal adjustment and binocular parallax or convergence will therefore be created in the brain of the human being. The brain will therefore be forced to create stereoscopic linkages, which will seem unnatural and will make it impossible to recognize the stereoscopic effect. If the printed material for stereoscopic viewing PM created by the prior-art method is looked at while disposed on a desk that is parallel to the horizontal surface, there will be inconsistencies in the depth perception, giving an unnatural stereoscopic view. In other words, the rectangle RTG of FIGS. 3 and 4 is a plan view with a height of zero, so that the rectangle RTG cannot be viewed stereoscopically.

Figure 8C:
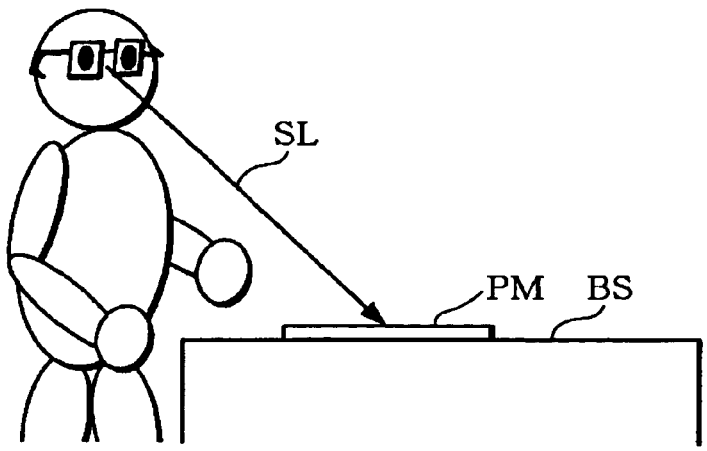

With this embodiment, it is assumed that the viewer looks at the printed material for stereoscopic viewing PM (display screen) while it is disposed on a desk (with the base surface BS parallel to a horizontal surface), as shown in FIG. 8C. In other words, this disposition is the default. disposition of this method. When the printed material for stereoscopic viewing PM is to be disposed parallel to a horizontal surface in this manner, creating the printed material for stereoscopic viewing PM by subjecting the images of FIGS. 3 and 4 to anaglyph processing without modification will create inconsistencies in the perspective.

With this embodiment, correction processing is executed to remove the perspective of the image of the base surface, as described with reference to FIGS. 5, 6, and 8A. The anaglyph processing is then performed based on the images of FIGS. 5 and 6, after the removal of the perspective of the base surface, to create the printed material for stereoscopic viewing PM, so that if the thus created printed material for stereoscopic viewing PM is disposed parallel to a horizontal surface as shown in FIG. 8C, the image of the base surface (the rectangle RTG) has a suitable perspective. If the printed material for stereoscopic viewing PM is disposed as shown in FIG. 8C, the focal distance to each point of the surface thereof will not be the same, but will differ. For that reason, the focal adjustment will be similar to that in the real world. The offsets in the relationships between the focal adjustment and binocular parallax or convergence are also therefore reduced, making it possible to implement a more natural stereoscopic view that has a feeling of reality.

Figure 10:
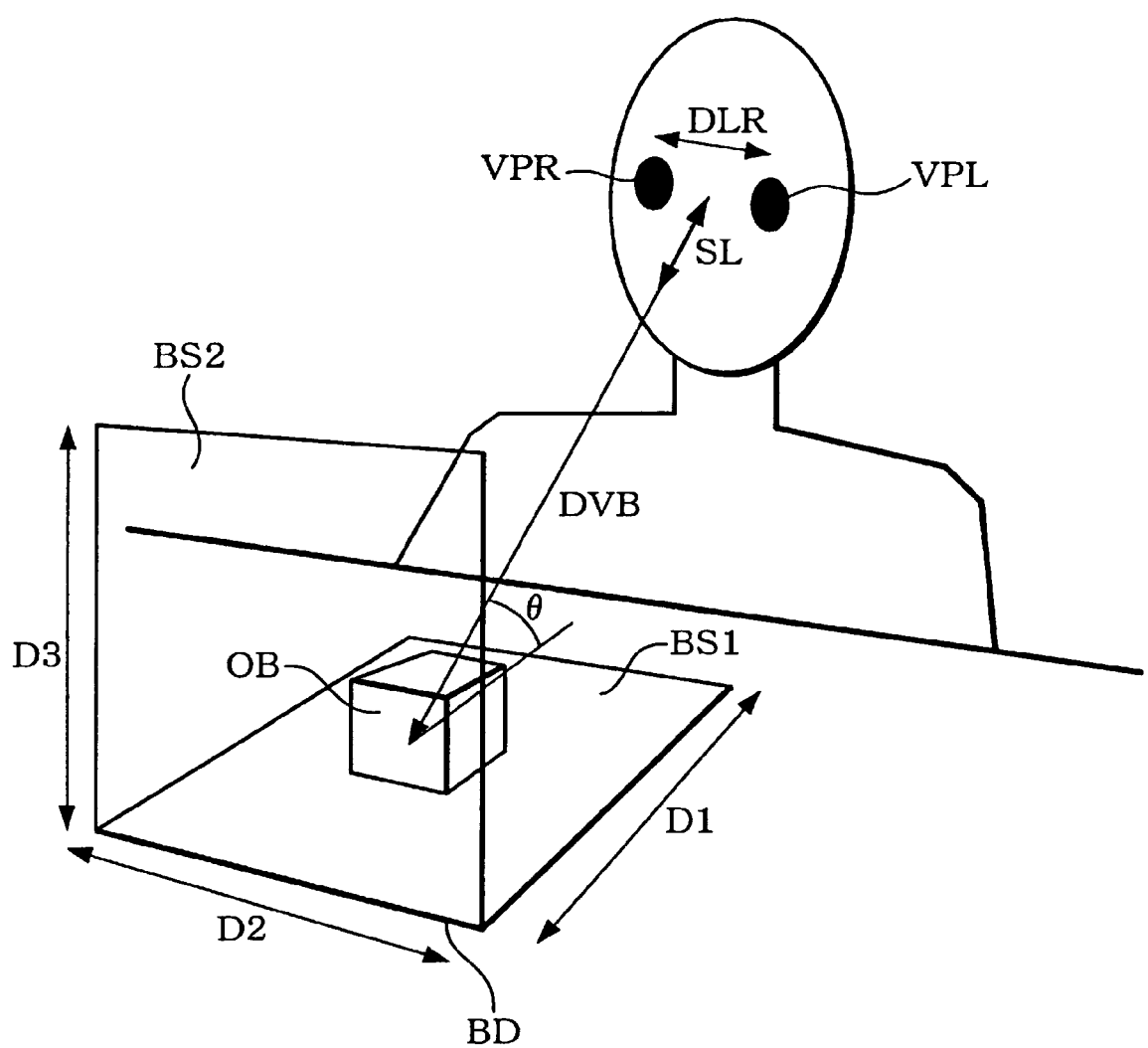
FIG. 10 is illustrative of a method of providing a plurality of base surfaces.

Note that there is a possibility that an offset in depth perception will occur in stereoscopic viewing method of this embodiment if the height of the object is too high. In such a case, two base surfaces BS1 and BS2 (generally speaking: a plurality of base surfaces) could be provided, as shown in FIG. 10.

In this case, the base surface BS1 is a surface that is parallel to a horizontal surface, by way of example. The base surface BS2, on the other hand, is a surface that subtends a predetermined angle (such as a right angle) with the base surface BS1. The base surfaces BS1 and BS2 are linked by a boundary BD.

The object OB (graphic object) is disposed on the base surface BS1 and also on the nearer side of the base surface BS2 (the side with VPL and VPR). The processing is performed as shown in FIG. 11 instead of that of FIG. 1.

Figure 11:
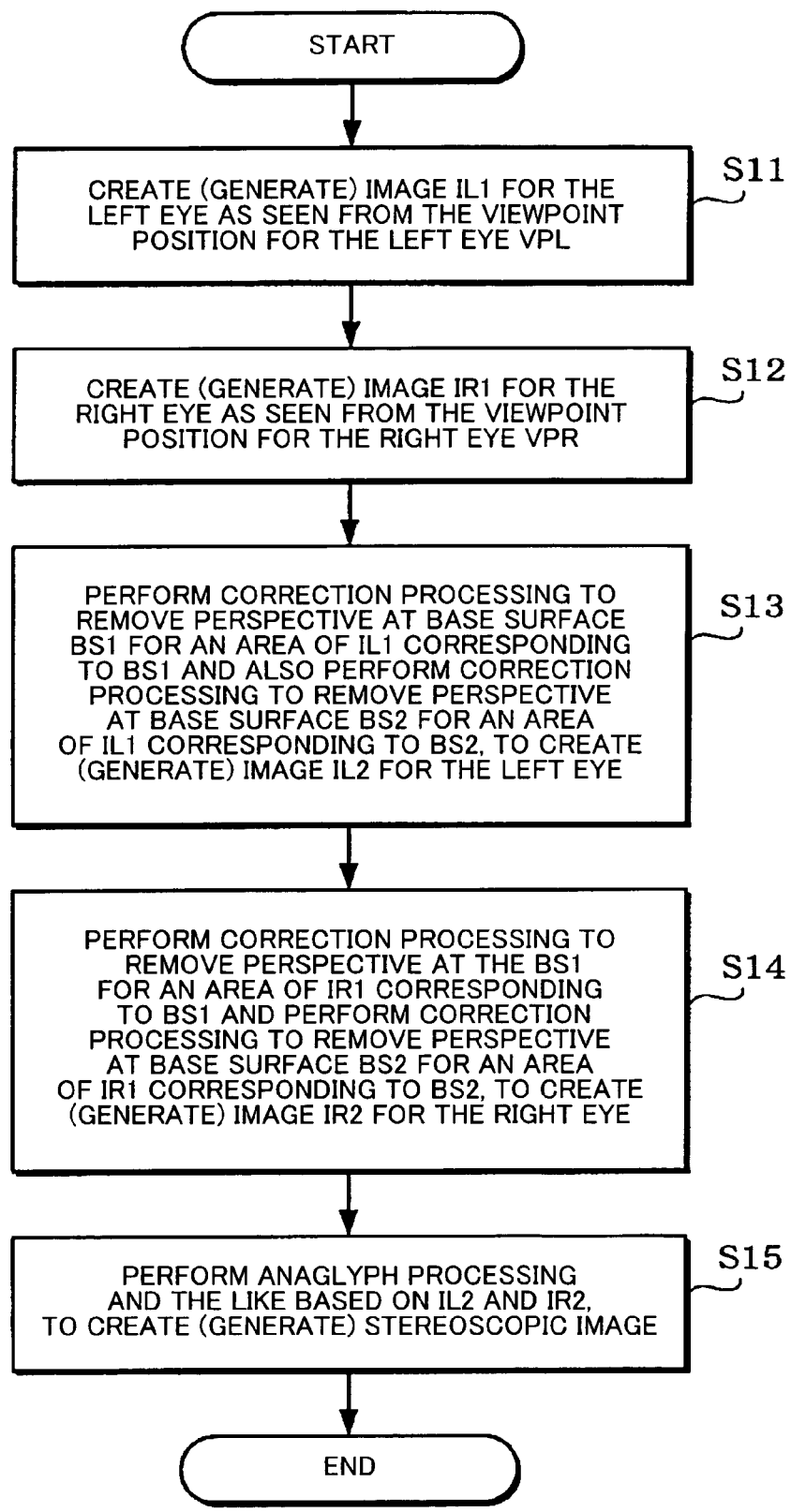
FIG. 11 is a flowchart of the method of providing a plurality of base surfaces.

Steps S11 and S12 of FIG. 11 are similar to steps S1 and S2 of FIG. 1. At step S13, correction processing to remove the perspective at the base surface BS1 is performed-for an area corresponding to the base surface BS1 for the image IL1 for the left eye (a first area of IL1 on the BS1 side with reference to the boundary BD). Correction processing for removing perspective at the base surface BS2 is then performed for an area corresponding to the base surface BS2 for IL1 (a second area of IL1 on the BS2 side with reference to the boundary BD). The image IL2 for the left eye, which is an image connecting the images generated by this correction processing, is then created (generated).

In step S14, correction processing to remove the perspective at the base surface BS1 is performed for an area corresponding to the base surface BS1 for the image IR1 for the right eye (a first area of IR1 on the BS1 side with reference to the boundary BD). Correction processing for removing perspective at the base surface BS2 is then performed for an area corresponding to the base surface BS2 for IR1 (a second area of IR1 on the BS2 side with reference to the boundary BD). The image IR2 for the right eye, which is an image connecting the images generated by this correction processing, is then created (generated).

In the final step S15, processing such as anaglyph processing is used to create (generate) a stereoscopic image, based on IL2 and IR2. The thus-obtained stereoscopic image could be printed on a print medium to produce printed material for stereoscopic viewing, or a game image that is a real-time moving image could be generated by displaying the stereoscopic image on a display section.

Figure 12:
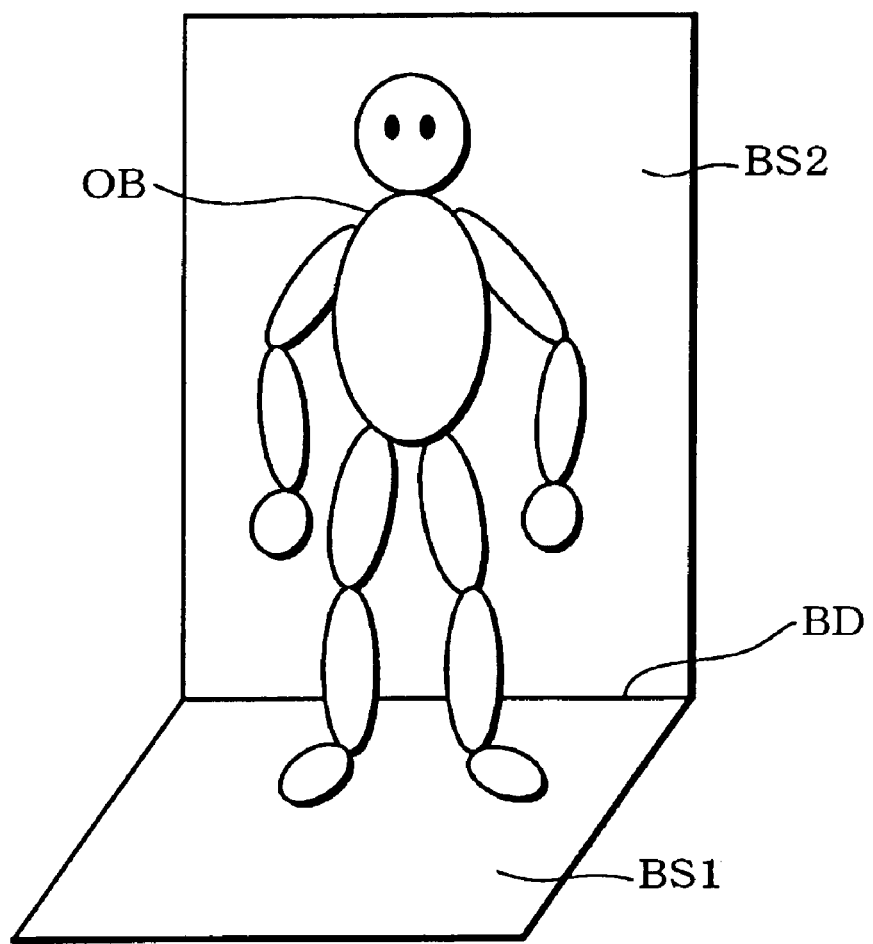
FIG. 12 is further illustrative of the method of providing a plurality of base surfaces.

This process makes it possible to implement a more natural stereoscopic view that has a feeling of reality, even when OB is an object that stands some height above the base surface BS1, as shown in FIG. 12. In other words, it is possible to implement a stereoscopic view in an area in the vicinity of the feet of the object OB (the first area on the lower side of the boundary BS with a natural depth perception or focal adjustment, by processing using the base surface BS1. Similarly, it is possible to implement a stereoscopic view in the other areas (the second area on the upper side of the boundary BS) with a natural depth perception, by processing using the base surface BS2.

Note that the number of base surfaces is not limited to two, and thus three or more base surfaces (a plurality of linked base surfaces) could be used.

2. Second Stereoscopic Viewing Method

Figure 13:
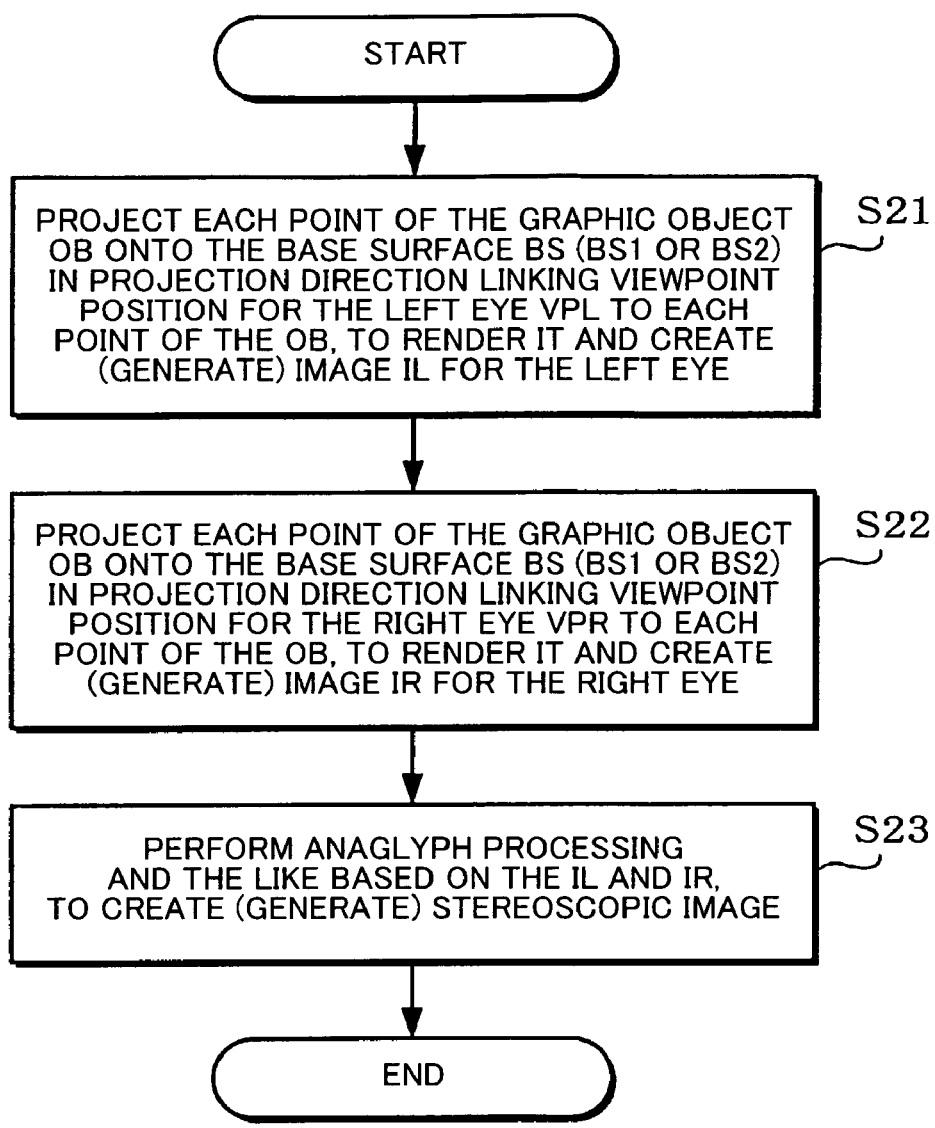
FIG. 13 is illustrative of a second stereoscopic viewing method in accordance with an embodiment of the present invention.

A flowchart of a second stereoscopic viewing method in accordance with this embodiment is shown in FIG. 13. In contrast to the previously described method of FIG. 1, which is the optimal method for using images captured by a camera to create printed material for stereoscopic viewing, the method of FIG. 13 is the optimal method for using CG images to create printed material for stereoscopic viewing.

First of all, the system projects each point of the graphic object OB onto the base surface BS (either BS1 or BS2 in the setup of FIG. 10) in a projection direction linking the viewpoint position VPL for the left eye to each point of the OB, to render it onto the base surface BS and create (generate) the image IL for the left eye (step S21).

It then projects each point of the graphic object OB onto the base surface BS (either BS1 or BS2 in the setup of FIG. 10) in a projection direction linking the viewpoint position VPR for the right eye to each point of the OB, to render it onto the base surface BS and create (generate) the image IR for the right eye (step S22). Note that the base surface BS is a surface that is not orthogonal to the line-of-sight direction (the direction linking the viewpoint position and a point of regard), by way of example. In other words, the base surface BS is a different surface from a perspective projection screen that is always orthogonal to the line-of-sight direction.

The processing of steps S21 and S22 projects a virtual beam of light from VPL (or VPR) toward the graphic object OB, in such a manner that the light is used to burn an image of the OB onto virtual paper that is the base surface BS (BS1 or BS2), to render it onto the virtual paper. This renders images (having properties such as color) of points P1, P2, P3, and P4 of the graphic object OB into projected points P1', P2', P3', and P4' on the base surface BS. Note that images of points P5 and P6 on the base surface BS are rendered without change at the positions of those points P5 and P6. It is possible to create an image IL for the left eye and an image IR for the right eye, similar to IL2 and IR2 of FIGS. 5 and 6, by rendering the entire surface of the base surface BS (virtual paper) by a raster scan, as shown by way of example in FIG. 14B. In other words, it is possible to create images IL and IR for the left eye and the right eye from which the perspective of the image of the base surface has been removed.

The system then performs anaglyph processing or the like, based on these images IL and IR for the left eye and the right eye, to create (generate) the stereoscopic image (step S23). This makes it possible to obtain a stereoscopic image such as that shown in FIG. 7. The thus-obtained stereoscopic image could be printed on a print medium to produce printed material for stereoscopic viewing, or a game image could be generated by displaying the stereoscopic image on a display section.

Figure 14A:
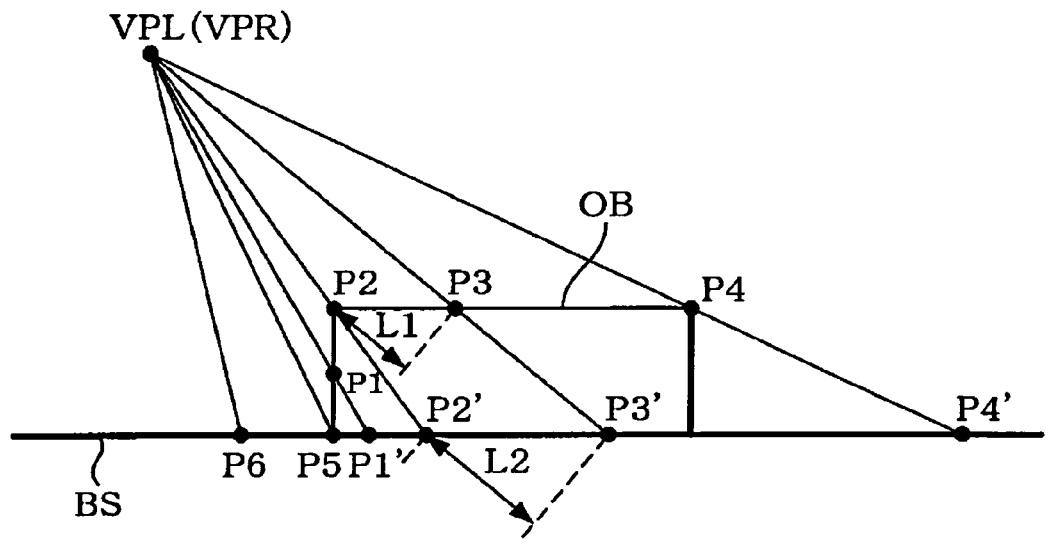
FIGS. 14A, 14B, and 14C are further illustrative of the second stereoscopic viewing method.
Figure 14B:
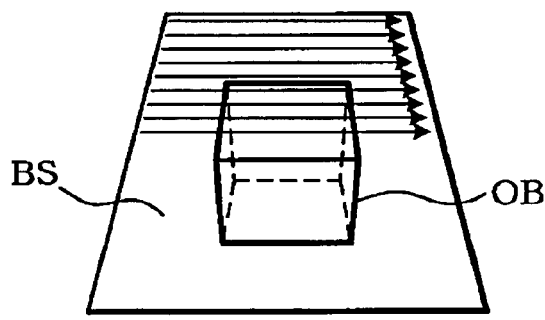
Figure 14C:
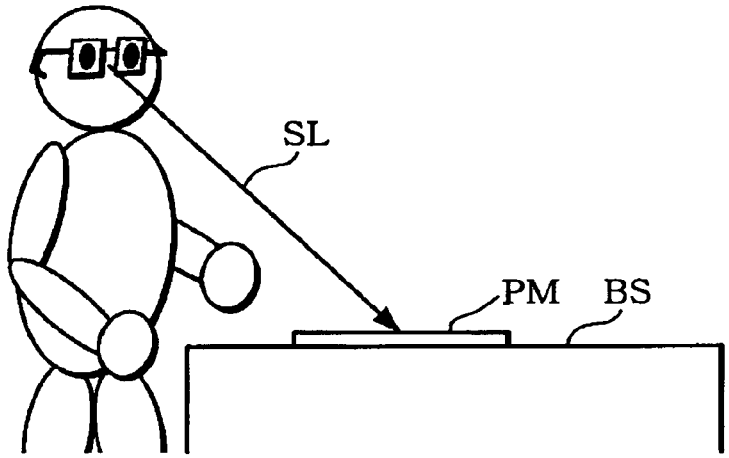

This makes it possible to implement a more natural stereoscopic view that has a feeling of reality, by disposing the printed material for stereoscopic viewing PM (or the display screen) so that it is parallel to a horizontal surface (base surface), as shown by way of example in FIG. 14C.

Figure 15A:
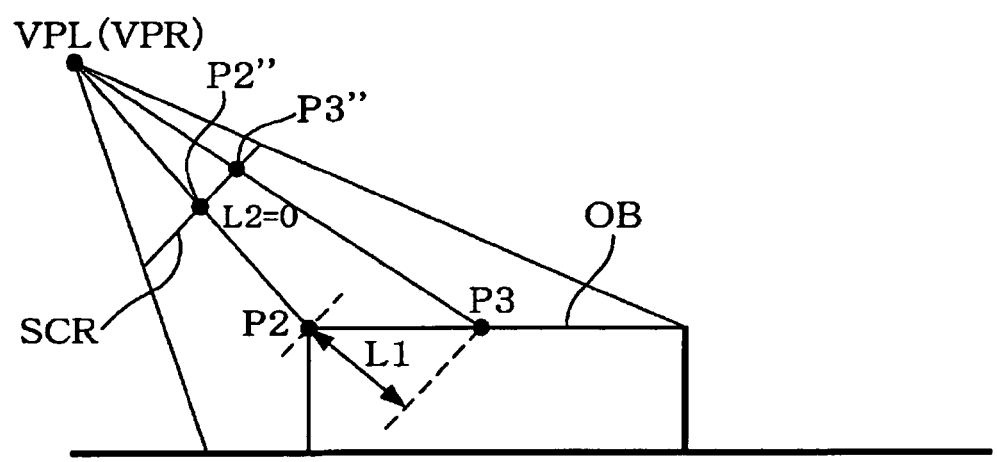
FIGS. 15A and 15B are illustrative of a prior-art method.
Figure 15B:
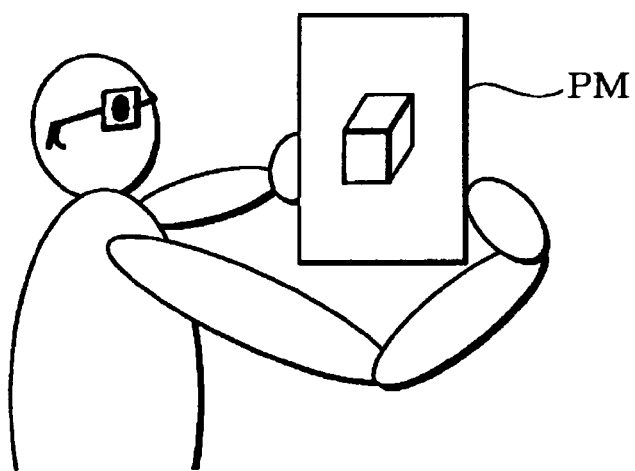

The graphic object OB is projected onto a perspective projection screen SCR (a surface that is orthogonal to the line-of-sight direction) to create the image for the left eye and the image for the right eye, as shown by way of example in FIG. 15A. The thus-obtained image for the left eye and image for the right eye are combined to create the printed material for stereoscopic viewing PM. The viewer looks at the printed material for stereoscopic viewing PM face-on, as shown in FIG. 15B.

With this method of FIG. 15A, the points P2 and P3 of the graphic object OB are projected onto points P2" and P3" on the projection projection screen SCR. Since the printed material for stereoscopic viewing PM is viewed face-on, as shown in FIG. 15B, the difference L2 in focal distance between P2" and P3" is zero. In other words, although the difference L1 in focal distance between the actual points P2 and P3 is not zero, L2 is zero and thus the focal adjustment differs from that in reality. This therefore creates an inconsistency in the relationship between focal adjustment and binocular parallax, creating confusion in the human brain which results in a stereoscopic view that has an incongruous feel.

In contrast thereto, since the printed material for stereoscopic viewing PM (display screen) of this embodiment is seen while placed on a desk as shown in FIG. 14C, the difference L2 in focal distance between the points P2' and P3' is not zero, in a similar manner to the difference L1 in focal distance between the actual points P1 and P2, as shown in FIG. 14A. Since the nearer portion (point P2) is seen to be nearer and the farther portion (point P3) is seen to be farther away, therefore, there is no inconsistency in the relationship between focal adjustment and binocular parallax and thus no confusion is created in the human brain, making it possible to implement a more natural stereoscopic view.

In other words, since the method of this embodiment ensures that the printed material for stereoscopic viewing PM is placed on a desk and is seen at an angle, the surface of the desk and the base surface BS (zero surface) on which the graphic object OB is placed as the subject of the stereoscopic view are in the same plane, enabling a natural, realistic stereoscopic view. Since it suffices to represent an appearance in which the graphic object OB floats a few centimeters above the base surface BS (zero surface), there is substantially no inconsistency in the depthwise direction. Moreover, since the base surface BS is the surface of the desk, it appears that the stereoscopic object is disposed on that desk in reality, increasing the realness of the object. In other words, since the base surface is ambiguous with the prior-art method of FIGS. 15A and 15B, the realness of the object can only make it seem like a phantom.

Note that the method of FIG. 13 can also create (generate) a stereoscopic image in which a plurality of base surfaces are set, as described previously with respect to FIG. 10. In such a case, steps S21 and S22 of FIG. 13 ensure that the points that are projected onto the base surface BS1 could be rendered onto the base surface BS1 and the points projected onto the base surface BS2 could be rendered onto that base surface BS2.

3. Anaglyph Processing

The anaglyph processing of step S5 of FIG. 1, step S15 of FIG. 11, and step S23 of FIG. 13 will now be described simply.

Anaglyph processing prints an image for the left eye and an image for the right eye in different colors on one sheet of print medium, to create a printed material for stereoscopic viewing. This printed material for stereoscopic viewing is viewed through color filters that differ for the left and right eyes (such as red for the left eye and blue for the right eye). During this time, the stereoscopic view is implemented by ensuring that the left eye sees only the image for the left eye and the right eye sees only the image for the right eye.

With monochrome anaglyph processing, for example, the image for the left eye (IL2 or IL) is converted to grayscale. The image data after the conversion is copied into the R channel of the anaglyph image (RGB). The image for the right eye (IR2 or IR) is then converted to grayscale. The image data after the conversion is copied into the G channel and the B channel of the anaglyph image (RGB). This creates a monochrome anaglyph image. Note that the image for the right eye could equally well be copied into the B channel alone.

With color anaglyph processing, the R channel of the image for the left eye (IL2 or IL) is copied into the R channel of the anaglyph image (RGB). Similarly, the G channel of the image for the right eye (IR2 or IR) is copied into the G channel of the anaglyph image (RGB). The B channel of the image for the right eye is copied into the B channel of the anaglyph image (RGB). This makes it possible to create a color (pseudo-color) anaglyph image.

Note that the method of implementing the stereoscopic view (step S5 of FIG. 1, step S15 of FIG. 11, or step S23 of FIG. 13) is not limited to anaglyph processing, providing at least an image for the left eye (IL2 or IL) and an image for the right eye (IR2 or IR) are used.

For instance, a special lens called a lenticular lens could be used to ensure that only the image for the left eye enters the left eye and only the image for the right eye enters the right eye, to implement the stereoscopic view.

It is also possible to dispose polarizing plates in front of the image for the left eye and the image for the right eye, where the polarizing plate placed before the image for the left eye has a different polarization direction than the polarizing plate placed before the image for the right eye. The stereoscopic view could be implemented by the viewer wearing spectacles in which polarizing plates having corresponding polarization directions are inserted into the lens portions thereof.

The image for the left eye and the image for the right eye are displayed alternately at each frame, by way of example. The stereoscopic view could be implemented by the viewer wearing spectacles in which a shutter (such as a liquid-crystal shutter) for the left eye opens in synchronization with the display of the image for the left eye and a shutter for the right eye opens in synchronization with the display of the image for the right eye.

4. Setting of Viewpoint Positions

The description now turns to a method of setting the viewpoint positions.

It is desirable that the viewpoint positions for the left eye and the right eye VPL and VPR shown in FIGS. 2 and 10 are disposed at the assumed positions of the left and right eyes of the viewer when the viewer is actually viewing the printed material for stereoscopic viewing or the display screen for the stereoscopic view. In the example shown in FIGS. 2 and 10, the viewpoint positions for the left eye and the right eye VPL and VPR are set on the basis of a distance DVB (such as 40 cm) between the object OB (graphic object, subject) and the viewer, a line-of-sight angle θ (line-of-sight direction SL), and a distance between the eyes DLR (such as 7 cm).

Figure 16:
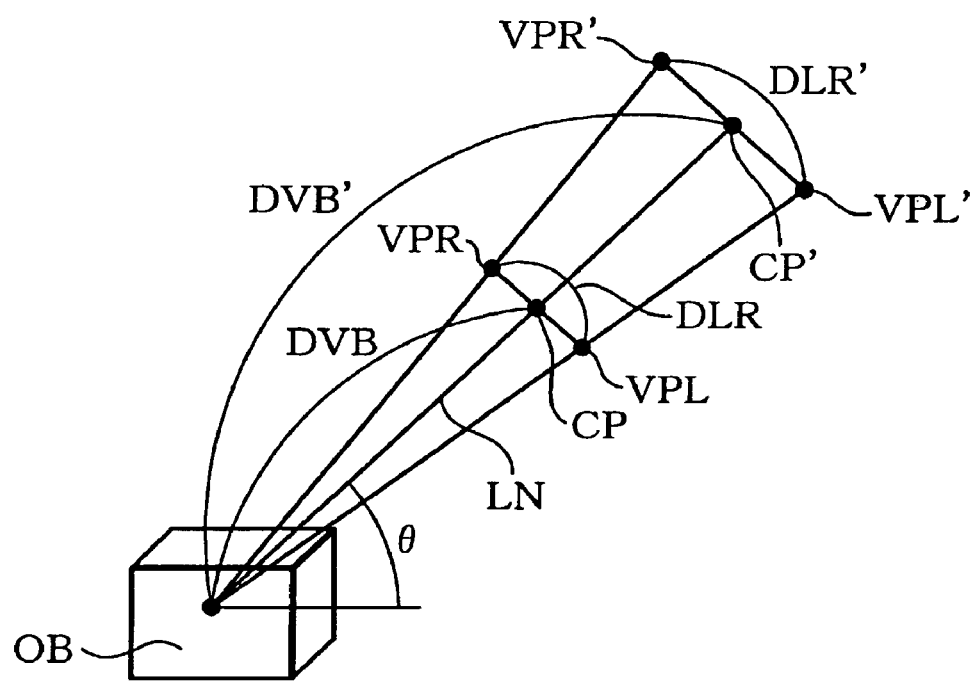
FIG. 16 is illustrative of a method of setting a viewpoint position.

It should be noted, however, that if the display is reduced or enlarged, the positions of VPL and VPR are moved in accordance with the reduction ratio or enlargement ratio. In such a case, it is desirable that the viewpoint positions are moved by a method such as that shown in FIG. 16.

If the distance DVB between the object OB (subject, graphic object) and the viewpoint position (a central point CP between VPL and VPR) becomes longer, by way of example, the distance DLR between the viewpoint position VPL for the left eye and the viewpoint position for the right eye VPR is increased in accordance with the change in this length (ratio). In other words, DLR is lengthened in proportion to the change in the length of DVB.

If the distance DVB between the object OB (subject, graphic object) and the viewpoint position (the central point CP between VPL and VPR) is changed, the viewpoint position (the central point CP, as well as VPL and VPR) is moved so as to move along a line LN (line-of-sight direction) that subtends the predetermined angle θ with respect to the base surface BS.

Since this ensures that the distance DVB and the distance DLR change at a uniform ratio, even when VPL and VPR are moved, it makes it possible to prevent a situation in which the stereoscopic perception fails. This makes it possible to implement a reduced or enlarged display while maintaining a suitable stereoscopic perception.

5. Use of Photographic Images to Create Printed Material for Stereoscopic Viewing The description now turns to details of a method of using photographic images to create (fabricate) printed material for stereoscopic viewing. The first method described with reference to FIG. 1 is applied in this case.

When using photographic images, it is necessary to ensure that the environment at capture is reproduced unchanged. The cameras (such as digital cameras) used for the photography are therefore disposed in a layout that is close to the positional relationship when the viewer looks at the result. For example, the cameras for the photography are disposed on the assumption that the printed material for stereoscopic viewing or the like is placed on a standard desk and the viewer is looking at it while sitting on a chair.

5.1 Case with One Base Surface

If there is one base surface as shown in FIG. 2, the distance between the eyes DLR (approximately 7 cm), the distance DVB between the viewpoint and the subject OB, the line-of-sight angle θ, and a longitudinal dimension D1 and a lateral dimension D2 (print region) of the print paper are set.

Cameras are then disposed at positions where the left and right eyes of the viewer are assumed to be. A sheet of paper on which marks MK1 to MK4 (first to fourth marks) have been drawn, to act as markers of the print region (D1 and D2), is positioned. These marks MK1 to MK4 form vertices of a rectangle on the base surface BS (where "rectangle" has a general meaning that also comprises "square").

The subject OB to be photographed is then mounted on the paper. During this time, the subject OB to be photographed is placed in such a manner that the OB does not protrude outside of the rectangle (print region) configured of the marks MK1 to MK4, as seen from the camera positions. The cameras that have been set at the positions that are assumed to be the positions of the left and right eyes are then used to capture images that include the subject OB to be photographed and the marks MK1 to MK4, to create the images IL1 and IR1 for the left eye and the right eye shown in FIGS. 3 and 4.

The captured images IL1 and IR1 for the left eye and the right eye are then fetched into an image generation system (personal computer or information processing device) and displayed on screen. The marks MK1 to MK4 of the paper are then located from the displayed images.

Figure 17:
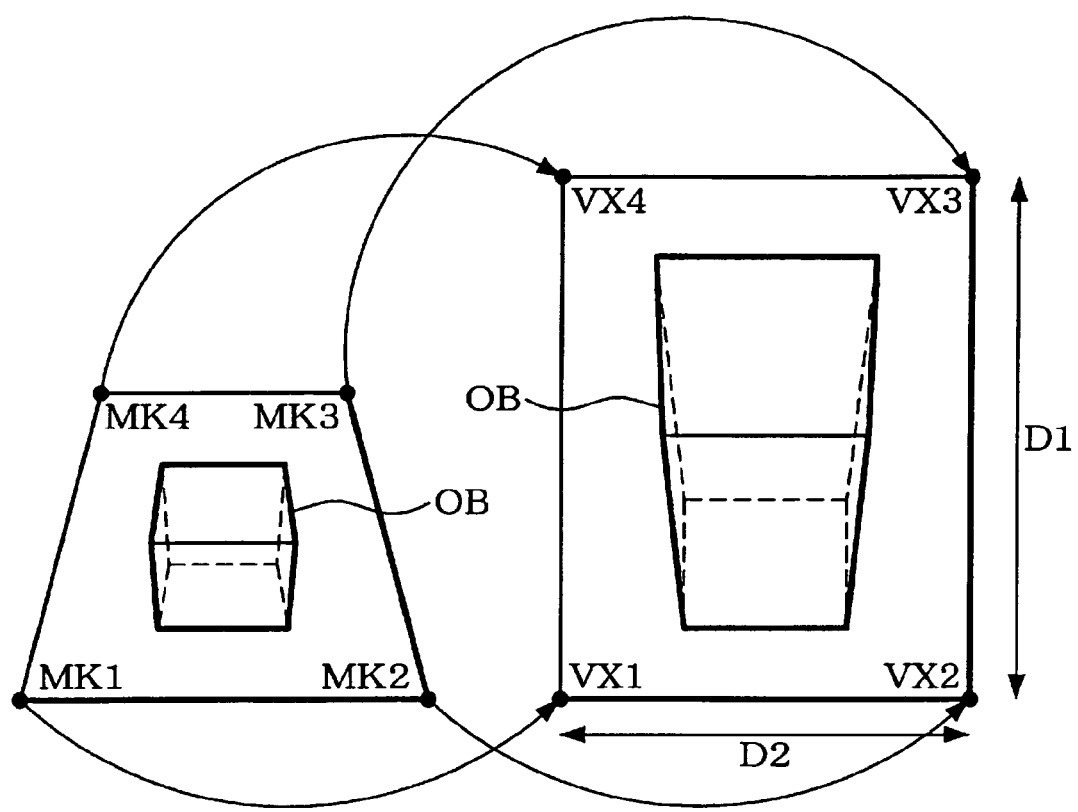
FIG. 17 is illustrative of a method of using photographic images for fabricating printed material for stereoscopic viewing.

As shown in FIG. 17, the marks MK1 to MK4 are moved to positions of vertices VX1 to VX4 of a rectangle (where "rectangle" has a general meaning that also comprises "square") having an aspect ratio of D1 to D2, to perform distortion correction processing of the images. This correction processing is done for each of the images IL1 and IR1 for the left eye and the right eye to create the images IL2 and IR2 for the left eye and the right eye such as those shown in FIGS. 5 and 6.

The unwanted portions outside the print region are trimmed. Software for anaglyph processing is then used to create a stereoscopic image (anaglyph image) such as that shown in FIG. 7 from the images IL2 and IR2 for the left eye and the right eye. The thus-obtained stereoscopic image is printed on paper in a print region of dimensions D1 and D2, to complete the printed material for stereoscopic viewing.

5.2 Case with Two Base Surfaces

If there are two base surfaces as shown in FIG. 10, the distance between the eyes DLR (approximately 7 cm), the distance DVB between the viewpoint and the subject OB, the line-of-sight angle θ, and a longitudinal dimension D1, a lateral dimension D2, and a height dimension D3 (print region) of the print paper are set.

Cameras are then disposed at positions where the left and right eyes of the viewer are assumed to be. A first sheet of paper (the base surface BS1) on which marks MK1 to MK4 (first to fourth marks) have been drawn, to act as markers of the print region (D1 and D2), is positioned. These marks MK1 to MK4 form vertices of a rectangle on the base surface BS1.

A second sheet of paper (the base surface BS2) on which marks MK5 to MK8 (fifth to eighth marks) have been drawn, to act as markers of the print region (D2 and D3) is placed behind the first sheet of paper and perpendicular thereto. These marks MK5 to MK8 form vertices of a rectangle on the base surface BS2.

The subject OB to be photographed is then mounted on the first sheet of paper. During this time, the subject OB to be photographed is placed in such a manner that the OB does not protrude outside of the rectangle configured of the marks MK1 to MK4 or the rectangle (print region) configured of the marks MK5 to MK8, as seen from the camera positions. The cameras that have been set at the positions that are assumed to be the positions of the left and right eyes are then used to capture images that include the subject OB to be photographed and the marks MK1 to MK4 and MK5 to MK8, to create the images (photographs) IL1 and IR1 for the left eye and the right eye.

The captured images IL1 and IR1 for the left eye and the right eye are then fetched into an image generation system (personal computer) and displayed on screen. The marks MK1 to MK4 and MK5 to MK8 of the paper are then located from the displayed images. Note that the marks MK3 and MK4 and the marks MK6 and MK5 could be the same.

Figure 18:
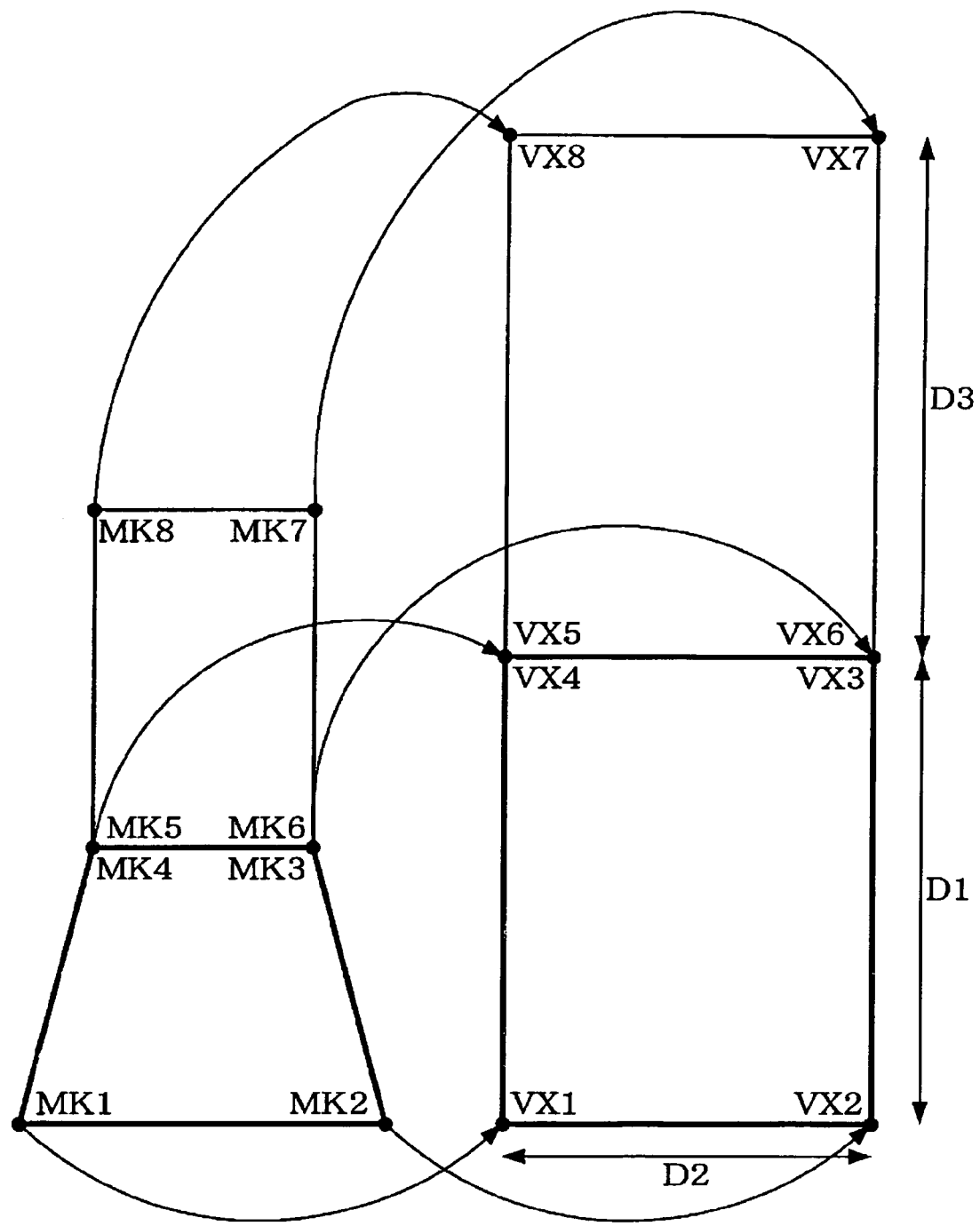
FIG. 18 is further illustrative of the method of using photographic images for fabricating printed material for stereoscopic viewing.

As shown in FIG. 18, the marks MK1 to MK4 are moved to positions of vertices VX1 to VX4 of a rectangle having an aspect ratio of D1 to D2, to perform distortion correction processing of the images. Similarly, the marks MK5 to MK8 are moved to positions of vertices VX5 to VX8 of a rectangle having an aspect ratio of D3 to D2, to perform distortion correction processing of the images. The thus-obtained two images are linked. This correction processing is done for each of the images IL1 and IR1 for the left eye and the right eye to create the images IL2 and IR2 for the left eye and the right eye.

The unwanted portions outside the print region are trimmed. Software for anaglyph processing is then used to create a stereoscopic image (anaglyph image) from the images IL2 and IR2 for the left eye and the right eye. The thus-obtained stereoscopic image is printed on paper in a print region of dimensions D1, D2, and D3, to complete the printed material for stereoscopic viewing.

6. Use of CG Images to Create Printed Material for Stereoscopic Viewing

The description now turns to details of a method of using computer graphics (CG) images to create (fabricate) printed material for stereoscopic viewing. The second stereoscopic viewing method described with reference to FIG. 13 is applied in this case. Note, however, that it is also possible to implement this with the first stereoscopic viewing method of FIG. 1.

First of all, virtual cameras (viewpoints) are disposed in the object space with a layout that is close to the positional relationship when the viewer looks at the result. For example, the virtual cameras are disposed on the assumption that the printed material for stereoscopic viewing or the like is placed on a standard desk and the viewer is looking at it while sitting on a chair.

The distance between the eyes DLR (approximately 7 cm), the distance DVB between the viewpoint and the graphic object OB, the line-of-sight angle $\theta$, and a longitudinal dimension D1 and a lateral dimension D2 (print region) of the print paper are set, as shown in FIG. 2.

The virtual cameras are then disposed at positions where the left and right eyes of the viewer are assumed to be. The graphic object is disposed on the virtual paper (a virtual paper graphic object).

A virtual beam of light is emitted from the viewpoint position VPL for the left eye towards the graphic object OB, and this light is used to render an image of the OB as if exposed on the virtual paper. This creates the image IL for the left eye. This processing is similar to the processing for projecting an image as seen by the eyes by a projector onto the virtual paper on the desk.

A virtual beam of light is emitted from the viewpoint position VPR for the right eye towards the graphic object OB, and this light is used to render an image of the OB as if exposed on the virtual paper. This creates the image IR for the right eye.

Anaglyph processing software is then used to create a stereoscopic image (anaglyph image) from the images IL and IR for the left eye and the right eye. The thus-obtained stereoscopic image is printed on paper in a print region of dimensions D1 and D2, to complete the printed material for stereoscopic viewing.

Note that printed material for stereoscopic viewing can also be created by providing a plurality of base surfaces such as is shown in FIG. 10, using CG images.

Figure 19A:
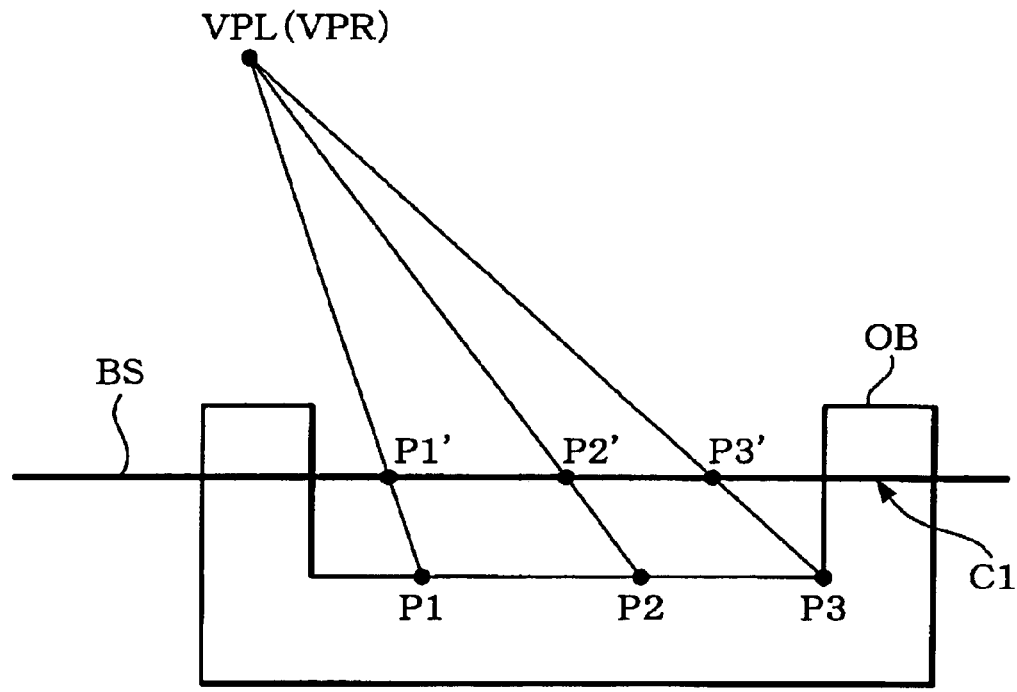
FIGS. 19A and 19B are illustrative of a method of using CG images for fabricating printed material for stereoscopic viewing.

The graphic object OB projected onto the base surface BS could either be such that all of the graphic object is disposed on the base surface BS, as shown in FIG. 2, or part thereof is disposed in the further side of the base surface BS, as shown in FIG. 19A. Alternatively, the entire graphic object could be disposed in the further side of the base surface BS, as shown in FIG. 19B.

In the example shown in FIG. 19A, points P1, P2, and P3 in the further side of the base surface BS are projected onto points P1', P2', and P3' that are closer. This makes it possible to represent a feature such as a hole in the graphic object OB. It is also possible to represent the appearance of the graphic object OB sinking into the virtual paper at a position C1 in FIG. 19A.

Figure 19B:
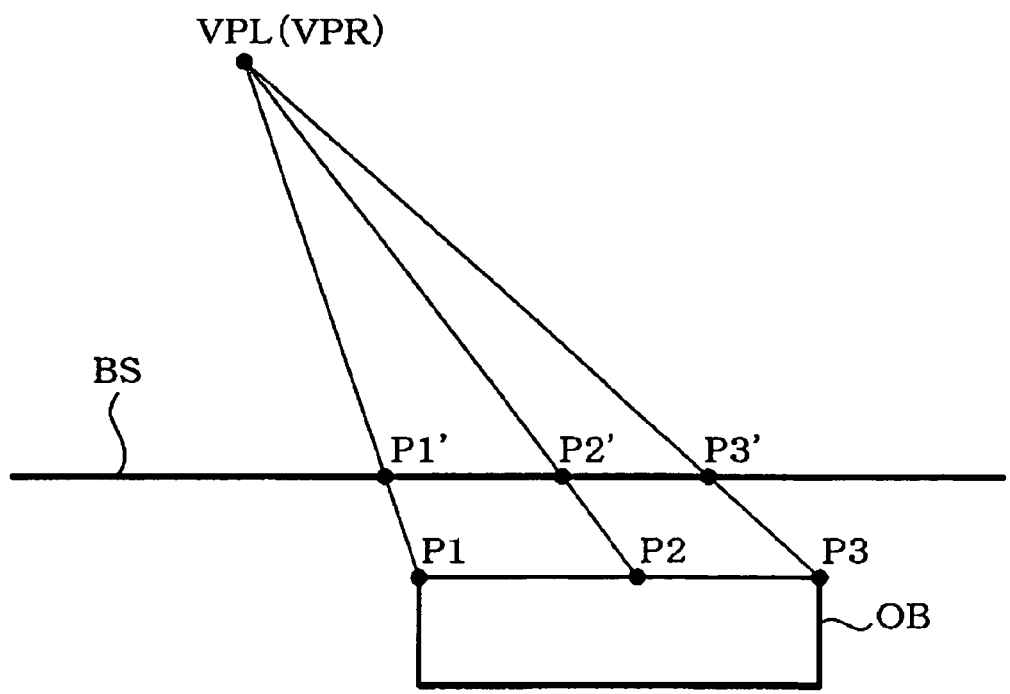

In the example shown in FIG. 19B too, points P1, P2, and P3 in the interior of the base surface BS are projected onto points P1', P2', and P3' that are closer. This makes it possible to represent graphic objects such as fish submerged below a water surface. Note that, when representing a semi-transparent thing such as a water surface, it is desirable to dispose a semi-transparent graphic object at the position of the base surface BS and perform alpha blending on this semi-transparent graphic object and the graphic object OB (points P1', P2', and P3').

The method of this embodiment of using CG images in this way makes it possible to create the ideal printed material for stereoscopic viewing for attachment to a game manual.

For example, a technical problem with a prior-art game manual that can only contain two-dimensional maps is that it is difficult for the player to grasp the contours or the like of such a map.

In contrast thereto, use of the method of this embodiment makes it possible to attach a map that can be viewed stereoscopically, as printed matter in the game manual. For example, to enable the use of shape data of a map as game data, it is possible to use that game data to create a printed map for stereoscopic viewing, in a simple manner. The method of this embodiment also makes it possible to provided printed material for stereoscopic viewing that is best for clearly exhibiting the optimal stereoscopic perception when placed on a desk or the like for viewing. It is therefore possible to provide the optimal printed material for stereoscopic viewing for attachment to the game manual, which is easy and convenient for the player to use.

Note that printed material for stereoscopic viewing that shows appropriate vehicles, tanks, and aircraft could also be appended to the game manual for a game that includes vehicles, tanks, and aircraft. Alternatively, application of the method of this embodiment to a monster card game makes it possible to implement a card game in which monsters on the cards appear to jump out in a stereoscopic manner. Since a card game in particular is enjoyed by placing the cards on a horizontal surface such as a desk or table, the method of this embodiment is ideal for enabling the most effective stereoscopic view when the cards are on a horizontal surface (base surface).

7. Generation of Game Images

The description now turns to a method of generating game images that are real-time moving images. In this case, the first stereoscopic viewing method described with reference to FIG. 1 is applied. It should be noted that it is also possible to implement the second stereoscopic viewing method of FIG. 13.

First of all, virtual cameras (viewpoints) are disposed in the object space with a layout that is close to the positional relationship when the player looks at the result. For example, the virtual cameras are disposed on the assumption that the printed material for stereoscopic viewing or the like is placed on a standard desk and the player is looking at it while sitting on a chair.

The distance between the eyes DLR (approximately 7 cm), the distance DVB between the viewpoint and the graphic object OB, the line-of-sight angle $\theta$, and a longitudinal dimension D1 and a lateral dimension D2 (display screen size) of the display screen are set, as shown in FIG. 2.

The virtual cameras are then disposed at the viewpoint positions for the left eye and the right eye VPL and VPR where the left and right eyes of the player are assumed to be. The object OB that is the subject of the virtual cameras is disposed within the object space. These virtual cameras are basically pointed in the direction of the graphic object (graphic object of regard) within the object space, from the viewpoint positions for the left eye and the right eye VPL and VPR.

Figure 20:
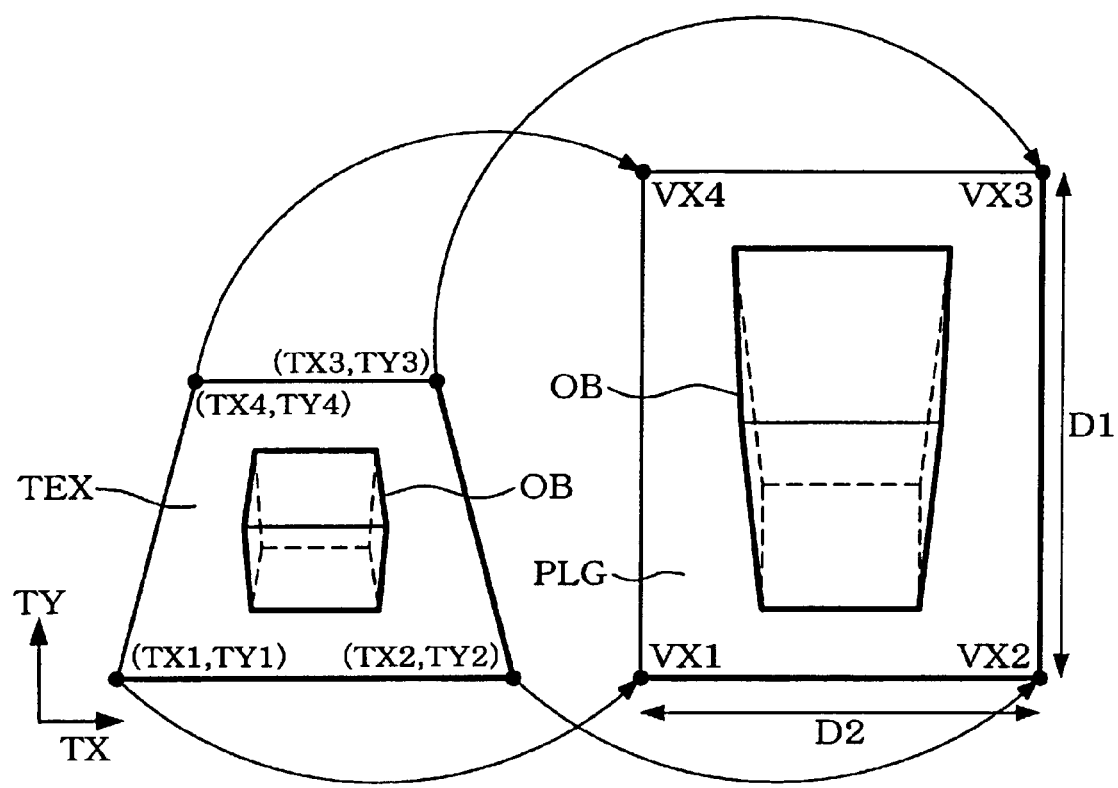
FIG. 20 is illustrative of correction processing using texture mapping.

Images IL1 and IR1 for the left eye and the right eye, as seen from the virtual cameras disposed at the viewpoint positions for the left eye and the right eye VPL and VPR, are then generated. The thus-generated images IL1 and IR1 for the left eye and the right eye are written to a texture area (texture space) in VRAM and those images are set on a texture image TEX, as shown in FIG. 20.

The texture image TEX with perspective (see FIGS. 3 and 4) is mapped onto a polygon PLG (primitive surface) of a rectangle (where "rectangle" has a general meaning that also comprises "square") of dimensions D1 and D2. More specifically, texture coordinates (TX1, TY1), (TX2, TY2), (TX3, TY3), and (TX4, TY4) of the texture image TEX are correlated with vertices VX1 VX2, VX3, and VX4 of the polygon PLG, to map the texture image TEX onto the polygon PLG. This makes it possible to generate an image of the base surface with perspective removed, as shown in FIGS. 6 and 7. This texture mapping processing is done for each of the images IL1 and IR1 for the left eye and the right eye to generate images IL2 and IR2 for the left eye and the right eye.

Anaglyph processing is then used to combine the thus-obtained images IL2 and IR2 for the left eye and the right eye into a single stereoscopic image. The thus-combined stereoscopic image is output to the display section.

Note that if the stereoscopic view is implemented by using liquid-crystal shutters or the like, the generated images IL2 and IR2 for the left eye and the right eye could be output alternately in different frames to the display section.

8. Image Generation System

Figure 21:
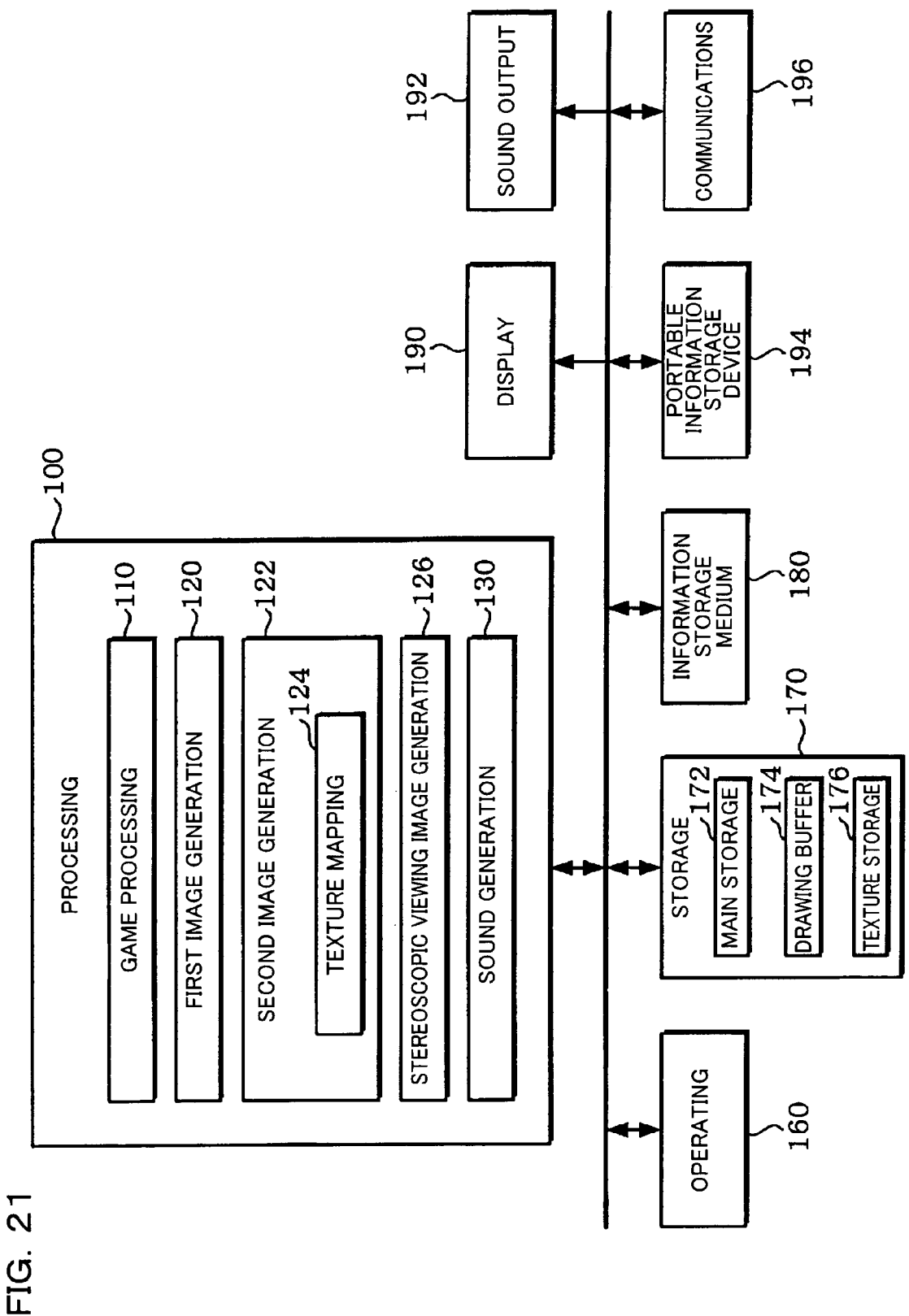
FIG. 21 shows an example of a configuration of an image generation system.

A functional block diagram of the image generation system of this embodiment is shown in FIG. 21. Note that the image generation system of this embodiment does not necessarily comprise all of the structural elements (components) shown in FIG. 21, and some of them could be omitted.

This image generation system of FIG. 21 can be used as a system for generating game images (real-time moving images). In addition, it is also possible to create stereoscopic images from CG images (static images), and use it as an image generation system (CG tools) for creating the printed material for stereoscopic viewing. It is also possible to use it as an image generation system for fetching photographic images captured by cameras, then creating a stereoscopic image from those photographic images, to create printed material for stereoscopic viewing.

An operating section 160 is designed to enable an player (operator) to input operating data, where the functions thereof can be implemented by hardware such as levers, buttons, a steering wheel, a shift lever, an accelerator pedal, a brake pedal, a microphone, sensors, a touch-panel, or a casing.

A storage section 170 acts as a work area for components such as the processing section 100 and the communications section 196, where the functions thereof can be implemented by hardware such as RAM.

An information storage medium 180 (a storage medium that can be read by a computer) is designed to store information such as programs and data, and its functions could be implemented by hardware such as an optical disk (CD or DVD), a magneto-optical (MO) disk, a magnetic disk, a hard disk, magnetic tape, or ROM. The processing section 100 performs the various types of processing in accordance with this embodiment, based on the information stored in this information storage medium 180. In other words, within the information storage medium 180 is stored (recorded, accommodated) a program (a program for causing the implementation of processing on a computer) that causes the computer to function as the various components of this embodiment.

A display section 190 is designed to output images generated by this embodiment of the present invention, and the functions thereof can be implemented by hardware such as a CRT, LCD panel, touch-panel, or head-mounted display (HMD).

A sound output section 192 is designed to output sounds created by this embodiment of the present invention, and the functions thereof can be implemented by hardware such as a speaker or headphones.

A portable information storage device 194 stores data such as a player's personal data and saved game data, and various devices such as a memory card or a portable game machine could be conceived as this portable information storage device 194.

The communications section 196 provides various types of control for communicating with an external device (such as a host device or another image generation system), and the functions thereof can be implemented by hardware such as various types of processor or a communications ASIC, or by a program. Use of this communications section 196 makes it possible to fetch the photographic images captured by cameras into the image generation system, and output the created stereoscopic images to a printer.

Note that a program or data for causing the implementation of the various processes of the present invention (this embodiment) on a computer could be distributed to the information storage medium 180 (the storage section 170) from an information storage medium possessed by a host device (server), through a network and the communications section 196. Such use of an information storage medium on the host device (server) is also comprised within the scope of the present invention.

The processing section 100 (processor) performs various types of processing, such as game processing, image generation processing, or sound generation processing, based on manipulation data or a program from the operating section 160 or a program. In such a case, the processing section 100 uses a main storage section 172 within the storage section 170 as a work area to perform various types of processing. The functions of this processing section 100 could be implemented by hardware such as various different processors (such as a CPU or DSP) or an ASIC (gate array), or by a program (game program).

The processing section 100 comprises a game processing section 110, a first image generation section 120, a second image generation section 122, stereoscopic image generation section 126, and a sound generation section 130.

In this case, the game processing section 110 performs various types of game processing based on manipulation data from the operating section 160 (game controller). This game processing includes processing such as that for starting the game, based on game start conditions; processing to move the game forward; processing for disposing the graphic objects (display objects) that appear in the game; processing for obtaining movement information (position, speed, and acceleration) and action information (motion information) of the graphic objects; processing for displaying the graphic objects; processing for calculating game results; or processing for ending the game when a game end condition has been satisfied.

The first image generation section 120 performs processing to generate a first image for the left eye that is an image as seen from a viewpoint position for the left eye (a virtual camera for the left eye) within the object space. It also performs processing to generate a first image for the right eye that is an image as seen from a viewpoint position for the right eye (a virtual camera for the right eye) within the object space. In this case, the first image for the left eye and the first image for the right eye are stereoscopic images, such as images exhibiting binocular parallax. More specifically, a virtual camera is disposed at the viewpoint position for the left eye and the line-of-sight direction of that virtual camera is pointed towards the of the graphic object (point of regard) to generate a first image for the left eye. Similarly, a virtual camera is disposed at the viewpoint position for the right eye and the line-of-sight direction of that virtual camera is pointed towards the graphic object (point of regard) to generate a first image for the right eye.

Note that images as seen from a virtual camera can be generated as described below. In other words, geometry processing such as coordinate conversion, clipping processing, transparency conversion, or light source processing is first performed, then drawing data (such as position coordinates of the vertices of primitive surfaces, texture coordinates, color data, normal vectors, or a values) are created based on the results of that processing. Objects (comprising one or a plurality of primitive surfaces) after the transparency conversion (after geometry processing) are drawn into a drawing buffer 174 (a buffer that enables the storage of image information in pixel units, such as a frame buffer or work buffer), based on this drawing data (primitive surface data). This causes the generation of images as seen from virtual cameras within the object space.

The second image generation section 122 performs correction processing on the first image for the left eye to remove the perspective of the image at the base surface, to generate the second image for the left eye. It also performs correction processing on the first image for the right eye to remove the perspective of the image at the base surface, to generate the second image for the right eye (see FIGS. 1 and 8A).

Correction processing in this case is implemented by a texture mapping section 124 performing the texture mapping described with reference to FIG. 20. More specifically, the first image for the left eye and the first image for the right eye generated by the first image generation section 120 are stored as texture images in a texture storage section 176. The texture mapping section 124 generates the second image for the left eye by mapping the thus-stored first image for the left eye onto a rectangular polygon. Similarly, it generates the second image for the right eye by mapping the thus-stored first image for the right eye onto the rectangular polygon.

The second image generation section 122 could also use the method described with reference to FIG. 13 to generate the image for the left eye and the image for the right eye. In other words, the second image generation section 122 generates the image for the left eye by rendering a projection of each point of the graphic object onto the base surface, in the projection direction linking the viewpoint position for the left eye to each point of the graphic object. It also generates the image for the right eye by rendering a projection of each point of the graphic object onto the base surface, in the projection direction linking the viewpoint position for the right eye to each point of the graphic object.

The stereoscopic image generation section 126 performs processing to generate the stereoscopic image, based on the second image for the left eye (image for the left eye) and the second image for the right eye (image for the right eye). For example, it combines the second image for the left eye (image for the left eye) and the second image for the right eye (image for the right eye) by anaglyph processing to generate the stereoscopic image, and outputs it to the display section 190. In such a case, the player wears spectacles provided with a red-colored filter and a blue-colored filter for the left eye and the right eye, to play the game.

Alternatively, the stereoscopic image generation section 126 could implement a stereoscopic view by processing that outputs the second image for the left eye (image for the left eye) and the second image for the right eye (image for the right eye) in different frames to the display section 190. In such a case, the player wears spectacles provided with shutters that open and close in synchronization with the frames, to play the game.

The sound generation section 130 performs sound processing based on the various processing results obtained by the processing section 100, to generate games sounds such as background music, sound effects, and voices, and outputs them to the sound output section 192.

Note that the image generation system of this embodiment could be applied to a system with a dedicated single-player mode, which enables one player to play the game, or it could also be applied to a system provided with a multi-player mode, which enables a plurality of players to play.

If a plurality of players are playing, the game images and game sounds supplied to this plurality of players could be created by using one terminal, or they could be created by using a plurality of terminals (game machines or mobile phones) connected by a network (transmission lines or communications circuitry) or the like.

9. Detection by Sensors

When game images are generated by the stereoscopic viewing method of this embodiment, it is desirable to detect the position and direction of each player by a sensor and set the viewpoint position VPL for the left eye and the viewpoint position for the right eye VPR of FIG. 2 on the basis of the thus-detected position and direction.

Figure 22A:
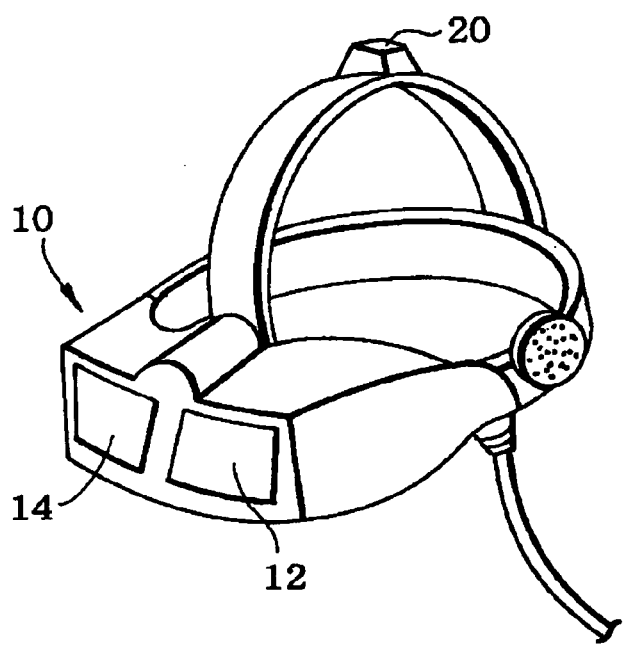
FIGS. 22A, 22B, and 22C are illustrative of a method of using sensors to detect viewpoint position.

More specifically, spectacles 10 are provided for the player to wear, as shown in FIG. 22A. If stereoscopic views are implemented by the anaglyph method, for example, a red-colored filter (generally speaking: a filter of a first color) is installed in a left eye portion 12 of the spectacles 10 and a blue-colored filter (generally speaking: a filter of a second color) is installed in a right eye portion 14 thereof. This makes it possible to implement the stereoscopic view by the anaglyph method, by ensuring that only the image for the left eye is seen by the left eye of the player and only the image for the right eye is seen by the right eye thereof.

If stereoscopic views are implemented by the shutter method, on the other hand, a first liquid-crystal shutter (generally speaking: a first shutter) is installed in the left eye portion 12 and a second liquid-crystal shutter (generally speaking: a second shutter) is installed in the right eye portion 14. When the image for the left eye is output to the display section 190, the first liquid-crystal shutter is opened and the second liquid-crystal shutter is closed. When the image for the right eye is output to the display section 190, the first liquid-crystal shutter is closed and the second liquid-crystal shutter is opened. This makes it possible to implement the stereoscopic view by the shutter method, by ensuring that only the image for the left eye is seen by the left eye of the player and only the image for the right eye is seen by the right eye thereof.

With this embodiment, a reception sensor 20 (generally speaking, a sensor) is installed in these spectacles 10 and the position and direction of the player are detected by this reception sensor 20.

Figure 22B:
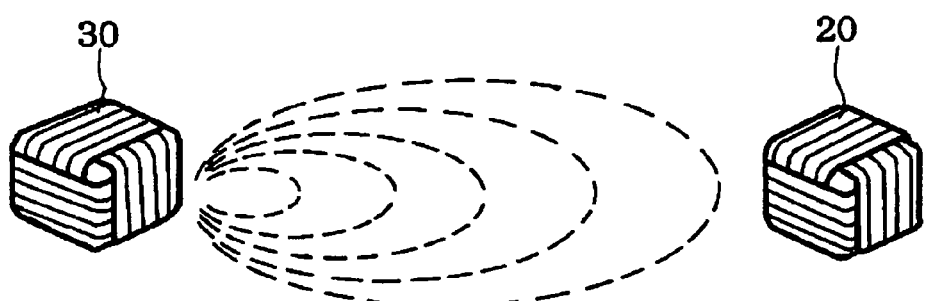

Magnetic fields can be utilized to detect the position and direction of the player (action information), as shown in FIG. 22B by way of example. Specifically, a transmission section 30 is configured of a source coil about which is wound coils in the XYZ directions. Similarly, the reception sensor 20 is configured of a source coil about which is wound coils in the XYZ directions. XYZ components of magnetic field are sequentially generated by the flow of currents in the three coils comprised by the source coil of the transmission section 30. As each magnetic field is generated, the resultant currents in the three coils comprised by the sensor coil of the reception sensor 20 are detected. The position and direction of the player are detected by measuring these detection currents.

Figure 22C:
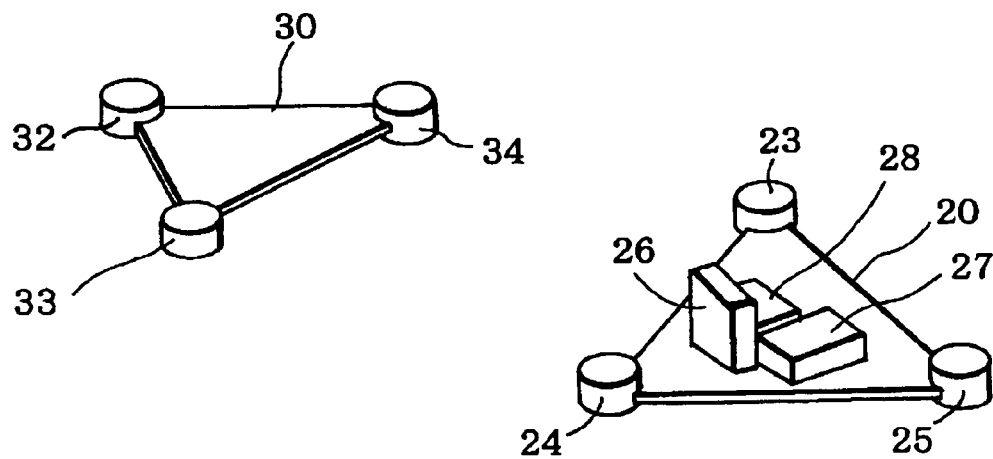

As shown in FIG. 22C, ultrasonic transmitters 32, 33, and 34 are installed in the transmission section 30. Similarly, ultrasonic receivers 23, 24, and 25 and piezoelectric oscillation gyros 26, 27, and 28 are installed in the reception sensor 20. The position and direction of the player are obtained by having the ultrasonic waves from the ultrasonic transmitters 32, 33, and 34 of the transmission section 30 received by the ultrasonic receivers 23, 24, and 25 of the reception sensor 20. Use of the piezoelectric oscillation gyros 26, 27, and 28 make it possible to detect angular speeds when the head portion of the player moves. The rotational angles of the player's head about predetermined axes are obtained from these angular speeds.

Use of the method of FIGS. 22A, 22B, and 22C makes it possible to obtain suitable stereoscopic images, even if the position and direction of the player should change, provided position and direction of the player are detected, the positions of the left and right eyes of the player are specified, and the viewpoint positions for the left eye and the right eye VPL and VPR shown in FIG. 2 are set at the thus-specified positions. If the player should move away from the screen or move closer thereto, for example, it is possible to reduce or enlarge the size of the display accordingly. If the line-of-sight direction should change too, it is possible to display a stereoscopic image that is appropriate for that line-of-sight direction. This makes it possible to view an image that has a stereoscopic feeling from whichever direction, enabling an increase in the player's impression of a virtual reality.

10. Multi-Player Game

Figure 23A:
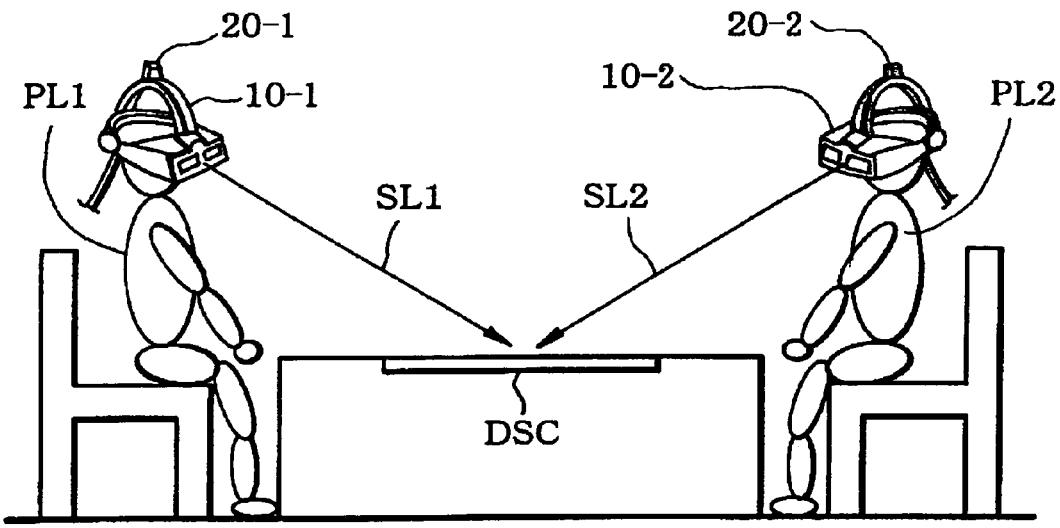
FIGS. 23A, 23B, and 23C are illustrative of a method of implementing a multi-player game with the stereoscopic viewing method of this embodiment.
Figure 23B:
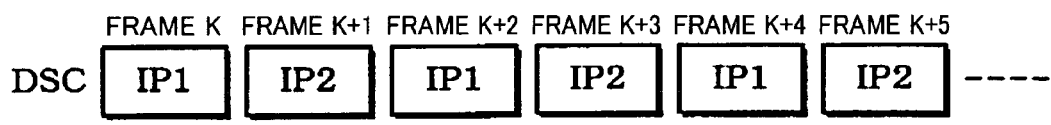

An example of the implementation of the image generation system of this embodiment to a multi-player game is shown in FIG. 23A.

As shown in FIG. 23A, a display screen DSC of the display section 190 is disposed parallel to a horizontal surface. Players PL1 and PL2 (first and second players) confront each other on opposite sides of the display screen DSC. The players PL1 and PL2 view the display screen DSC from a downward line of sight (bird's-eye-view line-of-sight). In other words, line-of-sight directions SL1 and SL2 look downward towards the display screen DSC.

The players PL1 and PL2 wear spectacles 10-1 and 10-2 such as those described with reference to FIG. 22A. Sensors 20-1 and 20-2 are provided in these spectacles 10-1 and 10-2, making it possible to detect the viewpoint position and line-of-sight direction of each of the players PL1 and PL2. A red-colored filter is installed in the left eye portion of each of the spectacles 10-1 and 10-2 and a blue-colored filter is installed in the right eye portion thereof. Of course, liquid-crystal shutters (generally speaking: shutters) could also be installed.

With this embodiment, a stereoscopic image for the player PL1 and a stereoscopic image for the player PL2 are displayed with differing frames on the display screen DSC of the display section 190. More specifically, stereoscopic images IP1 for the player PL1 are displayed in frames K, K+2, K+4, . . . , by way of example. Stereoscopic images IP2 for the player PL2, on the other hand, are displayed in frames K+1, K+3, K+5 . . . .

At frames K, K+2, K+4, . . . , in which the stereoscopic images IP1 for the player PL1 are displayed, the liquid-crystal shutter of the spectacles 10-1 of the player PL1 opens whereas the liquid-crystal shutter of the spectacles 10-2 of the player PL2 closes. Therefore, the player PL1 can view a stereoscopic image that is an anaglyph image displayed on the display screen DSC through the red-colored filter and the blue-colored filter installed in the left eye portion and right eye portion of the spectacles 10-1.

Similarly, at frames K+1, K+3, K+5, . . . , in which the stereoscopic images IP2 for the player PL2 are displayed, the liquid-crystal shutter of the spectacles 10-2 of the player PL2 opens whereas the liquid-crystal shutter of the spectacles 10-1 of the player PL1 closes. Therefore, the player PL2 can view a stereoscopic image that is an anaglyph image displayed on the display screen DSC through the red-colored filter and the blue-colored filter installed in the left eye portion and right eye portion of the spectacles 10-2. This makes it possible to implement stereoscopic views that are optimal for a multi-player game.

Figure 23C:

Note that if images for the left eye and images for the right eye are displayed alternately, instead of the display of an anaglyph image on the display screen DSC, the sequence can be as shown in FIG. 23C. In other words, an image for the left eye IP1L and an image for the right eye IP1R are displayed for the player PL1 on the display screen DSC at frames K and K+1, by way of example. Similarly, an image for the left eye IP2L and an image for the right eye IP2R are displayed for the player PL2 on the display screen DSC at frames K+2 and K+3. The image for the left eye IP1L and the image for the right eye IP1R are displayed for the player PL1 on the display screen DSC at frames K+4 and K+5.

At the frame K in which the image for the left eye IP1L of the player PL1 is displayed, only the liquid-crystal shutter for the left eye portion of the player PL1 opens, and the shutter for the right eye portion of the player PL1 and the liquid-crystal shutters for the left eye and right eye portions of the player PL2 close. Similarly, at the frame K+1 in which the image for the right eye IP1R of the player PL1 is displayed, only the liquid-crystal shutter for the right eye portion of the player PL1 opens, and the shutter for the left eye portion of the player PL1 and the liquid-crystal shutters for the left eye and right eye portions of the player PL2 close.

At the frame K+2 in which the image for the left eye IP2L of the player PL2 is displayed, only the liquid-crystal shutter for the left eye portion of the player PL2 opens, and the shutter for the right eye portion of the player PL2 and the liquid-crystal shutters for the left eye and right eye portions of the player PL1 close. Similarly, at the frame K+3 in which the image for the right eye IP2R of the player PL2 is displayed, only the liquid-crystal shutter for the right eye portion of the player PL2 opens, and the shutter for the left eye portion of the player PL2 and the liquid-crystal shutters for the left eye and right eye portions of the player PL1 close. This makes it possible to implement stereoscopic views in a multi-player game, without having to compose anaglyph images.

The stereoscopic viewing methods of this embodiment as described with reference to FIGS. 1 and 13 are particularly suitable for multi-player games, in comparison with prior-art stereoscopic viewing methods.

In other words, if images for the left eye and images for the right eye are displayed alternately, as shown by way of example in FIG. 23C, there is a danger that the effects of afterimages in the players' eyes will cause flickering of the images. With this embodiment, however, the display positions of the images for the left eye and the images for the right eye match at the base surface BS (zero surface), as described with reference to FIG. 9. Therefore, even if the images for the left eye and images for the right eye are displayed alternately, the images at the position of the base surface BS do not move, so it is difficult for the effects of afterimages to cause flickering in the players' eyes.

Moreover, since the base surface BS is at a location at which a map or the like is disposed, it is likely that it will take up a large portion of the display screen DSC. Therefore, with a prior-art stereoscopic viewing method in which flickering does occur at the base surface BS, this flickering is extremely obvious.

In contrast thereto, since the stereoscopic viewing methods of this embodiment ensure that it is difficult for flickering of the image to occur at the base surface BS that takes up a large portion of the display screen DSC, flickering of the screen can be greatly reduced in comparison with prior-art stereoscopic viewing methods.

11. Analysis of First and Second Stereoscopic Viewing Methods

Numerical analysis will now be performed on the first and second stereoscopic viewing methods of this embodiment, as described with reference to FIGS. 1 and 13. The first stereoscopic viewing method shows that it is possible to reconfigure an image of a real-world object that cannot be projected directly (C1) onto the base surface (desk) screen as long as virtually accepted, by taking photographs (FIGS. 3 and 4) obtained by camera capture (C2) and subjecting them to postprocessing (C3, the processing for removing perspective of FIG. 8A). Numerical analysis is performed here on the differences between this first stereoscopic viewing method and the second stereoscopic viewing that projects points of the object directly on the base surface (desk) screen.

11.1 Numerical Analysis of First Stereoscopic Viewing Method

Figure 24:
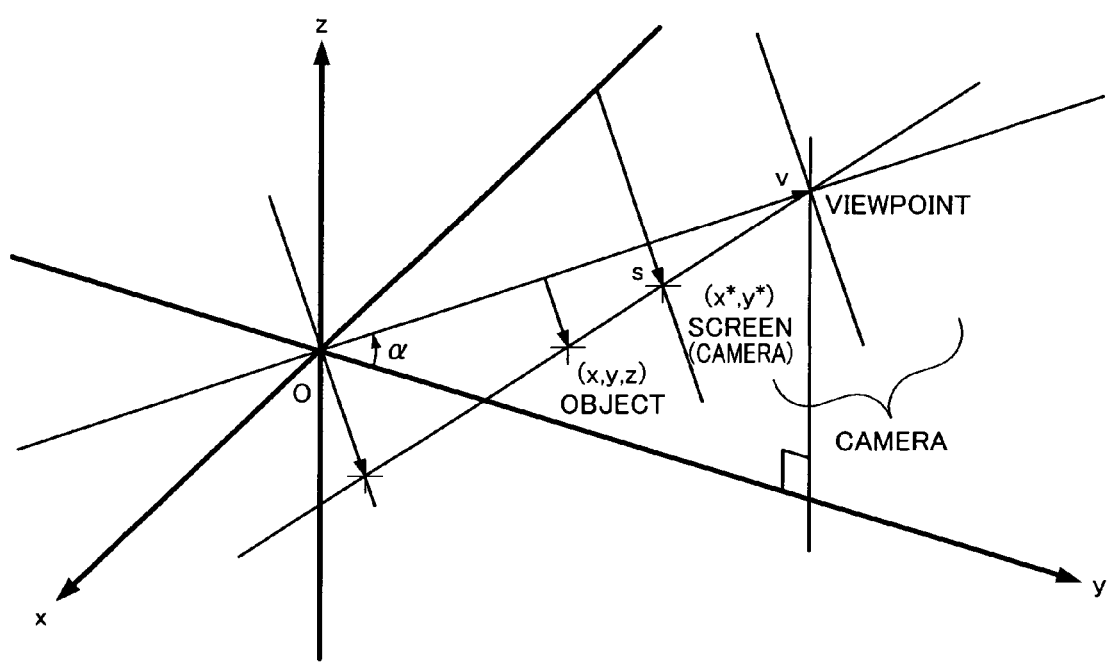
FIG. 24 is illustrative of a coordinate system.

First of all, a viewpoint (v), a camera screen (s), an object, and a coordinate system relating to those components are defined as shown in FIG. 24. In FIG. 24, projection from the viewpoint projects an object point (x, y, z) onto a point (x*, y*) on a screen (camera screen).

First of all, the camera capture (C2) can be expressed by a combination of a rotation matrix Rx of Equation (1) and a projection matrix Pz of Equation (2), as follows:

$$Rx\left(\theta = \frac{\pi}{2} - \alpha\right) = \begin{pmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{pmatrix} = \begin{pmatrix} 1 & 0 & 0 & 0 \\ 0 & \sin\alpha & -\cos\alpha & 0 \\ 0 & \cos\alpha & \sin\alpha & 0 \\ 0 & 0 & 0 & 1 \end{pmatrix} \quad (1)$$

$$Pz(z = s) = \begin{pmatrix} s-v & 0 & 0 & 0 \\ 0 & s-v & 0 & 0 \\ 0 & 0 & 0 & 0 \\ 0 & 0 & 1 & -v \end{pmatrix} \quad (2)$$

In this case, the rotation matrix Rx is a matrix that causes a rotation such that the line-of-sight direction of the diagonal direction is parallel to the Z-axis direction. The projection matrix Pz is a matrix that represents the projection onto a screen (Z=s) of a camera from a viewpoint (Z=v). Note that a is the angle subtended between the line-of-sight direction and the base surface screen.

The camera capture (C2) can therefore be expressed by Equation (3):

$$\begin{pmatrix} X \\ Y \\ 0 \\ H \end{pmatrix} = Pz(z=s) \times Rx\left(\theta = \frac{\pi}{2} - \alpha\right) \times \begin{pmatrix} x \\ y \\ z \\ 1 \end{pmatrix} \quad (3)$$

where: $\begin{cases} x' = x/H \\ y' = y/H \end{cases}$

This Equation (3) can be expressed as conversion equations such as Equation (4):

$$x' = \frac{s-v}{y\cos\alpha + z\sin\alpha - v}x \quad (4)$$

$$y' = \frac{s-v}{y\cos\alpha + z\sin\alpha - v}(y\sin\alpha - z\cos\alpha)$$

$$z' = s$$

Figure 25:
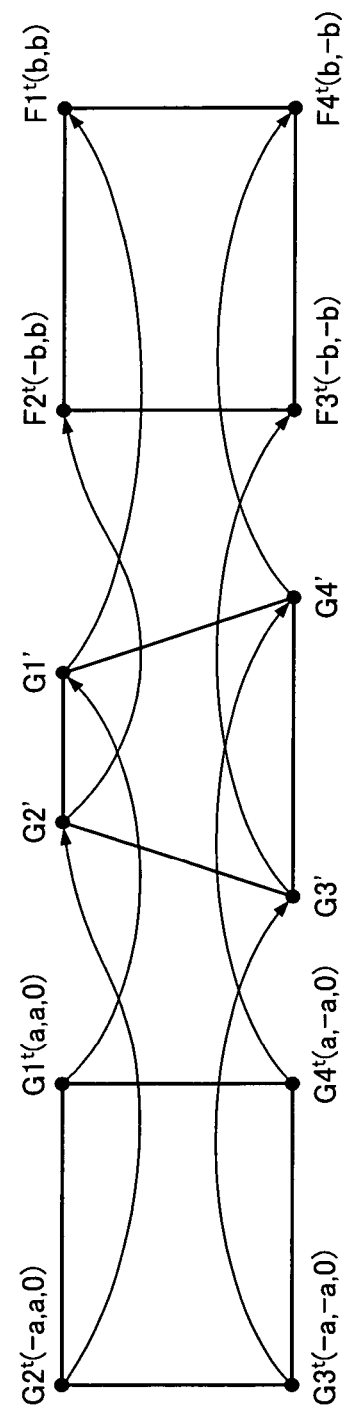
FIG. 25 is illustrative of the conversion from G1 to G4 to G1' to G4' and from G1' to G4' to F1 to F4.

Assume, by way of example, that four grid points G1=$^t$(a, a, 0), G2=$^t$(-a, a, 0), G3=$^t$(-a, -a, 0), and G4=$^t$(a, -a, 0) that form a square are set on a base surface such as a desk (Z=0), as shown by way of example in FIG. 25. Note that "t" means transform.

These grid points G1 to G4 are projected onto grid points G1' to G4' as shown in FIG. 25, by the conversions of Equations (3) and (4). The coordinates of these grid points G1' to G4' are calculated by substituting $^t$(a, a, 0), (-a, a, 0), $^t$(-a, -a, 0), and $^t$(a, -a, 0) into $^t$(x, y, z) of Equations (3) and (4), as shown in Equations (5) to (8) below.

$$G1\begin{pmatrix} a \\ a \\ 0 \end{pmatrix} \Rightarrow G1'\begin{pmatrix} c \\ c\sin\alpha \\ s \end{pmatrix} \Rightarrow F1\begin{pmatrix} b \\ b \end{pmatrix} \quad (5)$$

$$G2\begin{pmatrix} -a \\ a \\ 0 \end{pmatrix} \Rightarrow G2'\begin{pmatrix} -c \\ c\sin\alpha \\ s \end{pmatrix} \Rightarrow F2\begin{pmatrix} -b \\ b \end{pmatrix} \quad (6)$$

-continued $$G3\begin{pmatrix}-a\\-a\\0\end{pmatrix} \Rightarrow G3'\begin{pmatrix}d\\d\sin\alpha\\s\end{pmatrix} \Rightarrow F3\begin{pmatrix}-b\\-b\end{pmatrix} \quad (7)$$

$$G4\begin{pmatrix}a\\-a\\0\end{pmatrix} \Rightarrow G4'\begin{pmatrix}-d\\d\sin\alpha\\s\end{pmatrix} \Rightarrow F4\begin{pmatrix}b\\-b\end{pmatrix} \quad (8)$$

The postprocessing of the first stereoscopic viewing method (C3, the processing for removing perspective) performs projection conversion to project these grid points G1' to G4' onto grid point $F1='(b, b)$, $F2='(-b, b)$, $F3='(-b, -b)$, and $F4='(b, -b)$ that form a two-dimensional square on the photograph. In other words, this projection conversion projects the markers MK1 to MK4 (equivalent to G1' to G4') of FIG. 3 onto the positions of marerks MK1 to MK4 (equivalent to F1 to F2) of FIG. 5.

A matrix that represents such a projection P1 is obtained by solving simultaneous equations for matrix elements $a_{11}a_2, a_{13}, \ldots a_{33}$, as shown in Equation (9):

$$P1 = \begin{pmatrix}a_{11}&a_{12}&a_{13}\\a_{21}&a_{22}&a_{23}\\a_{31}&a_{32}&a_{33}\end{pmatrix} = \begin{pmatrix}\frac{b}{a}\times\frac{v}{v-s} & 0 & 0\\ 0 & \frac{b}{a}\times\frac{v}{v-s}\csc\alpha & 0\\ 0 & \frac{1}{v-s}\cot\alpha & 1\end{pmatrix} \quad (9)$$

The conversion of the first stereoscopic viewing method, which is a combination of camera capture (C2) and postprocessing (C3), can be expressed by the rotation matrix Rx of Equation (1), the projection matrix Pz of Equation (2), and the projection matrix P1 of Equation (9), enabling representation as shown by Equation (10):

$$\begin{pmatrix}X\\Y\\0\\H\end{pmatrix} = P1\times Pz(z=s)\times Px\left(\theta=\frac{\pi}{2}-\alpha\right)\times\begin{pmatrix}x\\y\\z\\1\end{pmatrix} \quad (10)$$

$$= \frac{b}{a}\begin{pmatrix}1&0&0&0\\0&1&-\cot\alpha&0\\0&0&0&0\\0&0&-\frac{1}{v\sin\alpha}&1\end{pmatrix}\begin{pmatrix}x\\y\\z\\1\end{pmatrix}$$

where: $\begin{cases}x'=X/H\\y'=Y/H\end{cases}$

This Equation (10) can be expressed as a conversion equation, as shown by Equation (11):

$$x' = \frac{b}{a}\times\frac{x}{1-\frac{z}{v\sin\alpha}} \quad (11)$$

$$y' = \frac{b}{a}\times\frac{y-z\cot\alpha}{1-\frac{z}{v\sin\alpha}}$$

As mentioned above, the first stereoscopic viewing method can be expressed as numerical formula such as Equation (10) or Equation (11).

11.2 Numerical Analysis of Second Stereoscopic Viewing Method

Figure 26:
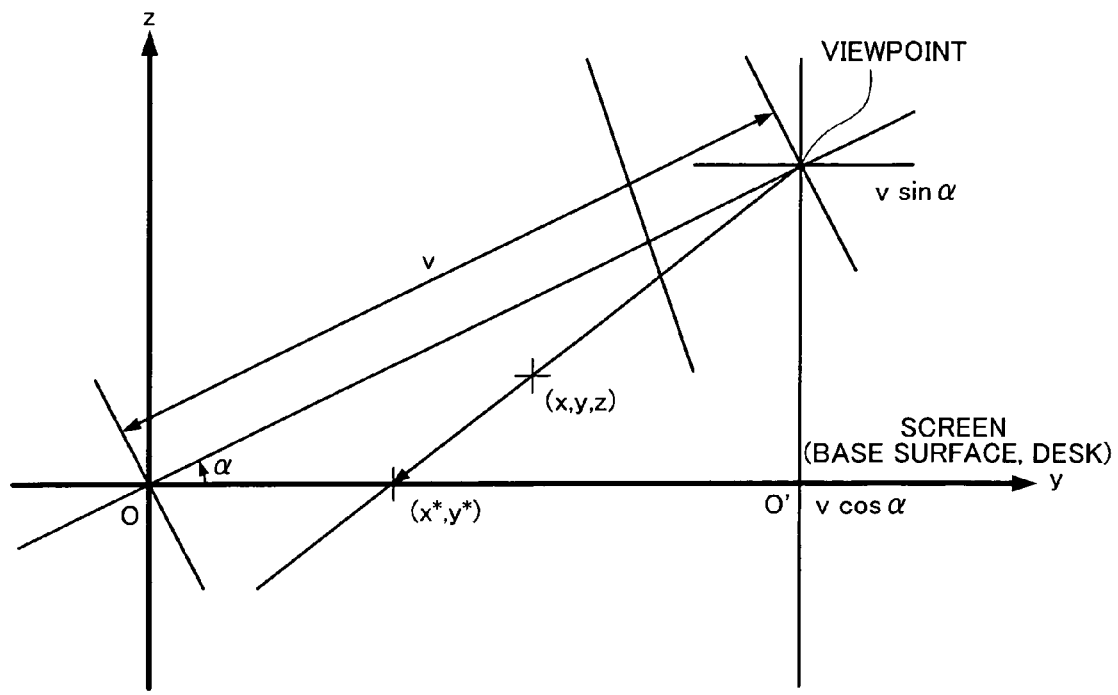
FIG. 26 is illustrative of the derivation of conversion equations of the second stereoscopic viewing method.

The conversion of the second stereoscopic viewing method of FIG. 13, in which the points of the object are projected directly onto a base surface screen, can be expressed by Equation (12), from FIG. 26.

$$\begin{pmatrix}X\\Y\\0\\H\end{pmatrix} = \begin{pmatrix}1&0&0&0\\0&1&0&-v\cos\alpha\\0&0&0&0\\0&0&-\frac{1}{v\sin\alpha}&1\end{pmatrix}\begin{pmatrix}x\\y\\z\\1\end{pmatrix} \quad (12)$$

where: $\begin{cases}x^*=X/H\\y^*=Y/H+v\cos\alpha\end{cases}$

This Equation (12) can also be expressed by a conversion equation such as Equation (13):

$$x^* = \frac{x}{1-\frac{z}{v\sin\alpha}} \quad (13)$$

$$y^* = \frac{y-v\cos\alpha}{1-\frac{z}{v\sin\alpha}} + v\cos\alpha$$

Figure 28:
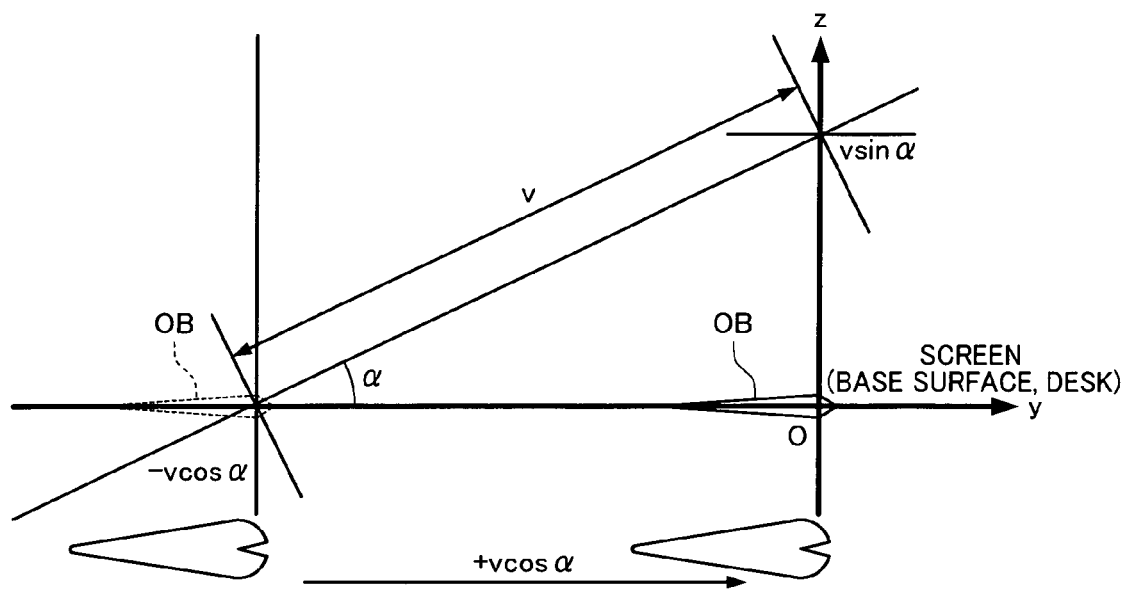
FIG. 28 is further illustrative of conversions that form the second stereoscopic viewing method.

The conversions of the second stereoscopic viewing method expressed by Equations (12) and (13) consist of the three conversions of parallel movement Ty (movement parallel to $-v \cos \alpha$ in the y direction) of the object OB, as shown in FIG. 27A; a projection Pz of the object OB after the parallel movement, as shown in FIG. 27B; and parallel movement Ty (movement parallel to $v \cos \alpha$ in the y direction) of the object OB after the projection, as shown in FIG. 28.

11.3 Comparison of First and Second Stereoscopic Viewing Methods

As described above, the conversion of the first stereoscopic viewing system can be expressed numerically by Equation (14) or (15) and the conversion of the second stereoscopic viewing method can be expressed numerically by Equation (16) or (17).

$$\begin{pmatrix}X\\Y\\0\\H\end{pmatrix} = \frac{b}{a}\begin{pmatrix}1&0&0&0\\0&1&-\cot\theta&0\\0&0&0&0\\0&0&-\frac{1}{v\sin\alpha}&1\end{pmatrix}\begin{pmatrix}x\\y\\z\\1\end{pmatrix} \quad (14)\; J1$$

where: $\begin{cases}x'=X/H\\y'=Y/H\end{cases}$ $$x' = \frac{b}{a}\times\frac{x}{1-\frac{z}{v\sin\alpha}} \quad (15)$$

$$y' = \frac{b}{a}\times\frac{y-z\cot\alpha}{1-\frac{z}{v\sin\alpha}} \quad J2$$

-continued $$\begin{pmatrix} X \\ Y \\ O \\ H \end{pmatrix} = \begin{pmatrix} 1 & 0 & 0 & 0 \\ 0 & 1 & 0 & -v\cos\alpha \\ 0 & 0 & 0 & 0 \\ 0 & 0 & -\frac{1}{v\sin\alpha} & 1 \end{pmatrix} \begin{pmatrix} x \\ y \\ z \\ 1 \end{pmatrix} \quad (16)$$

where: $\begin{cases} x^* = X/H \\ y^* = Y/H + v\cos\alpha \end{cases}$ $$x^* = \frac{x}{1 - \frac{z}{v\sin\alpha}} \quad (17)$$

$$y^* = \frac{y - z\cos\alpha}{1 - \frac{z}{v\sin\alpha}} + v\cos\alpha$$

The portions where Equations (14) and (16) differ are the items indicated by J1 and K1. The portions where Equation (15) and (17) differ are the items indicated by J2 and K2.

These differing portions can be described intuitively with the aid of the drawings, as follows. In other words, the previously described second stereoscopic viewing method consists of three conversions, as shown in FIGS. 27A, 27B, and 28. The first stereoscopic viewing method differs from the second stereoscopic viewing method in the magnitude of offset in the initial parallel movement shown in FIG. 27A. In other words, this offset magnitude is zcotα in the first stereoscopic viewing method (see J1 and J2 of Equations (14) and (15)). In contrast thereto, this offset magnitude in the second stereoscopic viewing method is v cos α (see K1 and K2 of Equations (16) and (17)).

Figure 29:
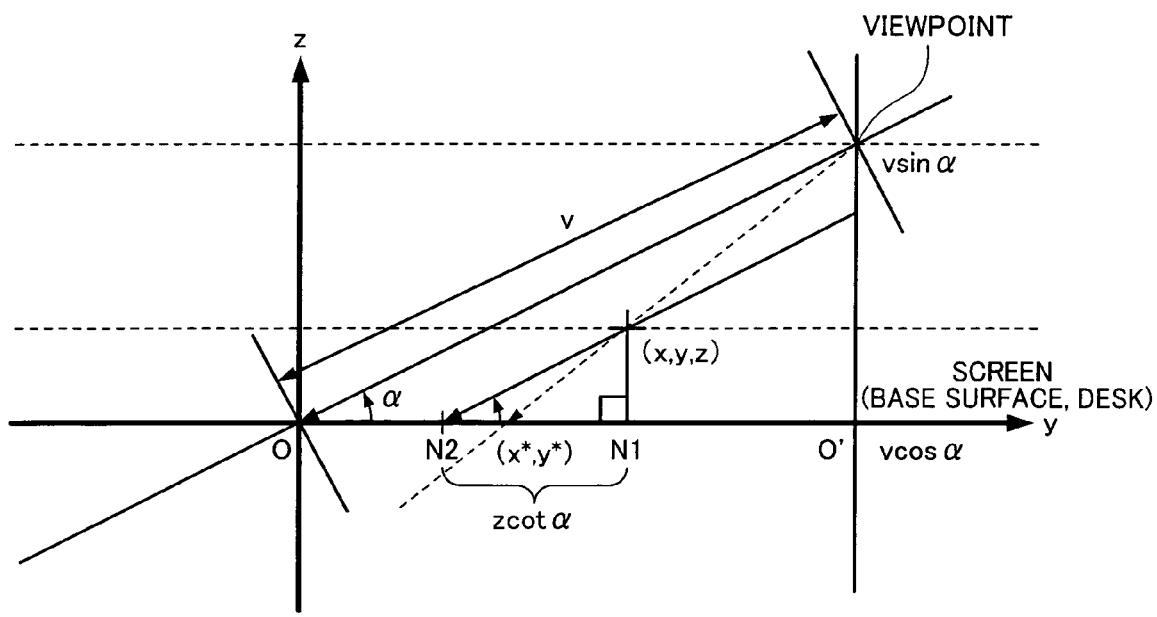
FIG. 29 is illustrative of an offset magnitude during the conversion of the first stereoscopic viewing method.

With this second stereoscopic viewing method, the offset magnitude (v cos α depends on the viewpoint (v) and the line-of-sight direction (α). With the first stereoscopic viewing method, on the other hand, the offset magnitude (zcotα) depends on the height (z) and the line-of-sight direction (a), but not on the viewpoint (v) itself. The offset magnitude (zcot α) of this first stereoscopic viewing method is equal to the distance between a point N1 at which a perpendicular line dropped from a point (x, y, z) of the object intersects the base surface (desk) screen and a point N2 at which a line extending from the point (x, y, z) of the object in the line-of-sight direction, not the projection direction, intersects the base surface screen, as shown in FIG. 29.

With this first stereoscopic viewing method, the offset magnitude (zcotα) of the parallel movement of FIG. 27A depends on the height (z). There will therefore be a disparity between the appearance of the stereoscopic view in the first stereoscopic viewing method and the appearance of the stereoscopic view in the second stereoscopic viewing method, in accordance with the height (z) of the object point (x, y, z), therein lies the difference between the first and second stereoscopic viewing methods differ.

Note that the present invention is not limited to this embodiment and thus various modifications thereto are possible within the scope of the invention laid out herein.

For example, terminology (such as red-colored filter, blue-colored filter, liquid-crystal shutter, reception sensor, object/subject, or polygon) that is derived within generic terminology defined within this document or drawings (such as first color filter, second color filter, shutter, sensor, graphic object, subject, or primitive surface) could be replaced by other terminology used within this document or drawings.

Similarly, the method of creating (generating) the image for the left eye, the image for the right eye, and the stereoscopic image is not limited to those described with reference to this embodiment, and various modifications thereto are possible.

The stereoscopic images created (generated) by the methods of the present invention can be used in applications other than printed material for stereoscopic viewing or game images.

The scope of the present invention also covers the generation of stereoscopic images by methods equivalent to the first and second methods described within this embodiment.

Part of requirements of a claim of the present invention could be omitted from a dependent claim which depends on that claim. Moreover, part of requirements of any independent claim of the present invention could be made to depend on any other independent claim.

The present invention can be applied to various games (such as beat'-em-up games, competitive games, shooting games, robot-battling games, sports games, and role-playing games).

This invention can be applied to various image generation systems (game systems) such as arcade game systems, domestic game systems, large-scale attractions in which many players can participate, simulators, multimedia terminals, and system boards that create game images.

The specification discloses the following matters about the configuration of the embodiments described above.

According to one embodiment of the present invention, there is provided an image generation system which generates a stereoscopic image, the image generation system comprising:

a first image generation section which generates a first image for the left eye as seen from a viewpoint position for the left eye within an object space, and also generates a first image for the right eye as seen from a viewpoint position for the right eye within the object space;

a second image generation section which generates a second image for the left eye by subjecting the first image for the left eye to correction processing for removing perspective of an image at a base surface in the first image for the left eye, and also generates a second image for the right eye by subjecting the first image for the right eye to correction processing for removing perspective of an image at the base surface in the first image for the right eye; and a stereoscopic image generation section which generates a stereoscopic image based on the second image for the left eye and the second image for the right eye.

In this embodiment, a second image for the left eye is generated from the first image for the left eye and a second image for the right eye from the first image for the right eye, by performing correction processing to remove the perspective of images at the base surface (such as the image of the base surface itself and images of objects at portions in contact with the base surface). A stereoscopic image is generated based on these second images for the left eye and the right eye. This makes it possible to provide a stereoscopic image that enables implementation of a more natural stereoscopic view with few inconsistencies in focal adjustment and depth perception.

In the image generation system, an image generation method, a program, and an information storage medium in accordance with this embodiment, the second image generation section:

may generate the second image for the left eye by mapping a texture of the first image for the left eye onto a rectangular polygon; and may generate the second image for the right eye by mapping a texture of the first image for the right eye onto a rectangular polygon.

This makes it possible to implement correction processing for removing perspective of an image at the base surface, by simple processing that maps a texture onto a rectangular polygon.

According to another embodiment of the present invention, there is provided an image generation system which generates a stereoscopic image, the image generation system comprising:

a first image generation section which generates a first image for the left eye as seen from a viewpoint position for the left eye within an object space, and also generates a first image for the right eye as seen from a viewpoint position for the right eye within the object space;

a second image generation section which generates a second image for the left eye based on the first image for the left eye, and generates a second image for the right eye based on the first image for the right eye; and a stereoscopic image generation section which generates a stereoscopic image based on the second image for the left eye and the second image for the right eye, wherein the second image generation section:

generates the second image for the left eye by mapping a texture of the first image for the left eye onto a rectangular polygon; and generates the second image for the right eye by mapping a texture of the first image for the right eye onto a rectangular polygon.

According to a further embodiment of the present invention, there is provided an image generation system which generates a stereoscopic image, the image generation system comprising:

an image generation section which generates an image for the left eye by rendering a projection of each point of a graphic object onto a base surface which is not orthogonal to a line-of-sight direction, in a projection direction linking a viewpoint position for the left eye to each point of the graphic object within an object space, and also generates an image for the right eye by rendering a projection of each point of the graphic object onto the base surface, in a projection direction linking a viewpoint position for the right eye to each point of the graphic object within the object space; and a stereoscopic image generation section which generates a stereoscopic image based on the image for the left eye and the image for the right eye.

In this embodiment, an image for the left eye is generated by rendering a projection of each point of the graphic object with respect to the base surface, in the projection direction linking the viewpoint position for the left eye with the points of the graphic object. An image for the right eye is generated by rendering a projection of each point of the graphic object with respect to the base surface, in the projection direction linking the viewpoint position for the right eye with the points of the graphic object. A stereoscopic image is generated from these images for the left eye and the right eye. This makes it possible to generate a stereoscopic image that enables the implementation of a more natural stereoscopic view with few inconsistencies in focal adjustment and depth perception. Note that the base surface is a surface which is not orthogonal to the line-of-sight direction (the direction linking the central point between the viewpoint position for the left eye and the viewpoint position for the right eye with the point of regard of the virtual camera), by way of example. In other words, this surface differs from a transparent conversion screen that is orthogonal to the line-of-sight direction.

In the image generation system, the image generation method, the program, and the information storage medium, the graphic object projected onto the base surface may be a graphic object which is disposed on the base surface. In the image generation system, the image generation method, the program, and the information storage medium, the graphic object which is projected onto the base surface may be a graphic object at least part of which is disposed at a further side from the base surface as seen from the viewpoint position for the left eye and the viewpoint position for the right eye.

In the image generation system, the image generation method, the program, and the information storage medium, when a distance between a graphic object and a viewpoint position has been extended, a distance between the viewpoint position for the left eye and the viewpoint position for the right eye may be extended in accordance with the change in length of the distance between the graphic object and the viewpoint position.

Note that the viewpoint position could be a central point between the viewpoint position for the left eye and the viewpoint position for the right eye, by way of example.

In the image generation system, the image generation method, the program, and the information storage medium, a viewpoint position may be moved along a line having a predetermined angle with respect to the base surface, when a distance between a graphic object and the viewpoint position is to be changed.

In the image generation system, the image generation method, the program, and the information storage medium, a display screen of a display section may be set as the base surface, a stereoscopic image being displayed on the display screen.

This makes it possible to generate an optimal stereoscopic image that has a feeling of reality, by setting the display screen of the display section so that it is parallel to a horizontal surface.

In the image generation system, the image generation method, the program, and the information storage medium, the viewpoint position for the left eye and the viewpoint position for the right eye may be set based on a position and direction of a player which are detected by a sensor.

This makes it possible to preserve a suitable stereoscopic view, even when the position and direction of the player have changed from the assumed position and direction.

In the image generation system, the image generation method, the program, and the information storage medium, a stereoscopic image for a first player and a stereoscopic image for a second player may be displayed on a display section in different frames.

This makes it possible to implement an optimal stereoscopic view in a multi-player game.

What is claimed is:

1. An image generation system which generates a stereoscopic image, the image generation system comprising:

an image generation section which generates an image of a graphic object for a left eye by rendering a projection of each point of the graphic object onto a base surface which is not orthogonal to a line-of-sight direction, in a projection direction linking a viewpoint position for the left eye to each point of the graphic object within an object space, and also generates an image of the graphic object for a right eye by rendering a projection of each point of the graphic object onto the base surface, in a projection direction linking a viewpoint position for the right eye to each point of the graphic object within the object space; and a stereoscopic image generation section which generates a stereoscopic image based on the image for the left eye and the image for the right eye.

2. The image generation system as defined in claim 1,
wherein the graphic object projected onto the base surface is a graphic object which is disposed on the base surface.

3. The image generation system as defined in claim 1,
wherein the graphic object which is projected onto the base surface is a graphic object at least part of which is disposed at a further side from the base surface as seen from the viewpoint position for the left eye and the viewpoint position for the right eye.

4. The image generation system as defined in claim 1,
wherein, when a distance between the graphic object and a viewpoint position has been extended, the image generation system extends a distance between the viewpoint position for the left eye and the viewpoint position for the right eye in accordance with the change in length of the distance between the graphic object and the viewpoint position.

5. The image generation system as defined in claim 1,
wherein the image generation system moves a viewpoint position along a line having a predetermined angle with respect to the base surface, when a distance between the graphic object and the viewpoint position is to be changed.

6. The image generation system as defined in claim 1,
wherein a display screen of a display section is set as the base surface, a stereoscopic image being displayed on the display screen.

7. The image generation system as defined in claim 1,
wherein the image generation system sets the viewpoint position for the left eye and the viewpoint position for the right eye based on a position and direction of a player which are detected by a sensor.

8. The image generation system as defined in claim 1,
wherein the image generation system displays a stereoscopic image for a first player and a stereoscopic image for a second player on a display section in different frames.

9. An image generation method for generating a stereoscopic image, the image generation method comprising:
generating an image of an object for a left eye by rendering a projection of each point of a graphic object onto a base surface which is not orthogonal to a line-of-sight direction, in a projection direction linking a viewpoint position for the left eye to each point of the graphic object within an object space;
generating an image of the object for a right eye by rendering a projection of each point of the graphic object onto the base surface, in a projection direction linking a viewpoint position for the right eye to each point of the graphic object within the object space; and
generating a stereoscopic image based on the image for the left eye and the image for the right eye.

10. A computer readable medium embedded with a computer program for generating an image, the program causing a computer to function as:
an image generation section which generates an image of an object for a left eye by rendering a projection of each point of a graphic object onto a base surface which is not orthogonal to a line-of-sight direction, in a projection direction linking a viewpoint position for the left eye to each point of the graphic object within an object space, and also generates an image of the object for a right eye by rendering a projection of each point of the graphic object onto the base surface, in a projection direction linking a viewpoint position for the right eye to each point of the graphic object within the object space; and
a stereoscopic image generation section which generates a stereoscopic image based on the image for the left eye and the image for the right eye.

* * * * *